US012541255B2

(12) United States Patent
Gupta

(10) Patent No.: US 12,541,255 B2
(45) Date of Patent: *Feb. 3, 2026

(54) GESTURE OPERATED WRIST MOUNTED CAMERA SYSTEM

(71) Applicant: Vikas Gupta, Los Angeles, CA (US)

(72) Inventor: Vikas Gupta, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/503,762

(22) Filed: Nov. 7, 2023

(65) Prior Publication Data

US 2024/0152215 A1 May 9, 2024

Related U.S. Application Data

(63) Continuation of application No. 17/690,754, filed on Mar. 9, 2022, now Pat. No. 11,861,069, which is a continuation of application No. 16/363,261, filed on Mar. 25, 2019, now abandoned, which is a continuation of application No. 14/634,674, filed on Feb. 27, 2015, now Pat. No. 10,254,843.

(60) Provisional application No. 62/101,289, filed on Jan. 8, 2015, provisional application No. 61/946,622, filed on Feb. 28, 2014.

(51) Int. Cl.
G06F 3/01 (2006.01)
G06F 3/0346 (2013.01)
G06F 3/0484 (2022.01)
H04N 23/51 (2023.01)

(52) U.S. Cl.
CPC .............. *G06F 3/017* (2013.01); *G06F 3/011* (2013.01); *G06F 3/014* (2013.01); *G06F 3/0346* (2013.01); *G06F 3/0484* (2013.01); *H04N 23/51* (2023.01)

(58) Field of Classification Search
CPC .......... G06F 3/017; G06F 3/011; G06F 3/014; G06F 3/0346; G06F 3/0484; H04N 23/51
See application file for complete search history.

(56) References Cited

U.S. PATENT DOCUMENTS

| | | | | |
|---|---|---|---|---|
| 8,107,599 B2 * | 1/2012 | Topiwala | ......... | H04N 21/42203 379/88.17 |
| 8,292,833 B2 * | 10/2012 | Son | ........................ | A61B 5/681 600/407 |
| 9,116,666 B2 * | 8/2015 | Salter | ...................... | G06F 3/017 |
| 9,390,500 B1 * | 7/2016 | Chang | ..................... | G06F 3/011 |
| 9,524,028 B2 * | 12/2016 | Dai | ........................... | G06T 7/11 |
| 9,785,247 B1 * | 10/2017 | Horowitz | ............. | H04N 13/296 |

(Continued)

OTHER PUBLICATIONS

Henderson, Micro-Scale Smart Actuator Modules for Imaging Systems (Year: 2012).*

(Continued)

*Primary Examiner* — William Lu
(74) *Attorney, Agent, or Firm* — Young Basile Hanlon & MacFarlane, P.C.

(57) ABSTRACT

A system and method for capturing media are disclosed. In a first aspect, the system comprises a wristband device that includes at least one sensor and a camera coupled to the wristband device. The camera is controlled by at least one gesture determined using the at least one sensor. In a second aspect, the method comprises providing a wristband device that includes at least one sensor, coupling a camera to the wristband device, determining at least one gesture using the at least one sensor, and controlling the camera by using the at least one gesture.

15 Claims, 19 Drawing Sheets

(56) References Cited

U.S. PATENT DOCUMENTS

| | | | | |
|---|---|---|---|---|
| 10,133,342 B2* | 11/2018 | Mittal | | G06F 3/04842 |
| 10,185,399 B2* | 1/2019 | Niinuma | | G06F 3/017 |
| 10,254,843 B2* | 4/2019 | Gupta | | G06F 3/0346 |
| 10,334,233 B2* | 6/2019 | Cho | | H04N 13/296 |
| 10,372,020 B2* | 8/2019 | Raskin | | G03B 15/02 |
| 10,701,316 B1* | 6/2020 | Cheung | | H04N 7/157 |
| 2004/0262342 A1* | 12/2004 | Pringle | | A45F 5/00 224/221 |
| 2005/0062122 A1* | 3/2005 | Gallup | | H01S 5/02253 257/432 |
| 2005/0094019 A1* | 5/2005 | Grosvenor | | G03B 17/00 348/335 |
| 2007/0050139 A1* | 3/2007 | Sidman | | F16M 11/18 318/649 |
| 2007/0127577 A1* | 6/2007 | Tourapis | | H04N 19/56 375/E7.113 |
| 2007/0236577 A1* | 10/2007 | Ke | | H04N 23/68 348/208.99 |
| 2008/0312010 A1* | 12/2008 | Marty | | H04N 23/80 73/865.4 |
| 2009/0089682 A1* | 4/2009 | Baier | | G06Q 10/10 715/751 |
| 2009/0110235 A1* | 4/2009 | Marti | | G06F 3/04842 382/103 |
| 2009/0303176 A1* | 12/2009 | Chen | | H04N 9/3176 345/156 |
| 2009/0327171 A1* | 12/2009 | Tan | | G06F 3/015 706/12 |
| 2010/0199232 A1* | 8/2010 | Mistry | | G06F 3/0426 715/863 |
| 2010/0290529 A1* | 11/2010 | Topiwala | | H04N 7/014 348/E7.003 |
| 2011/0054360 A1* | 3/2011 | Son | | A61B 5/1126 600/595 |
| 2012/0016960 A1* | 1/2012 | Gelb | | H04N 7/147 709/217 |
| 2012/0121185 A1 | 5/2012 | Zavesky | | |
| 2012/0172126 A1 | 7/2012 | Padovani et al. | | |
| 2012/0249409 A1* | 10/2012 | Toney | | G06F 3/017 345/156 |
| 2012/0250947 A1* | 10/2012 | Abramovich | | G06V 40/1312 382/115 |
| 2012/0281129 A1* | 11/2012 | Wang | | H04N 23/611 348/333.01 |
| 2012/0293544 A1* | 11/2012 | Miyamoto | | G06F 3/005 345/620 |
| 2013/0336519 A1* | 12/2013 | Connor | | G06V 30/142 382/100 |
| 2014/0028546 A1* | 1/2014 | Jeon | | G06F 3/04842 345/156 |
| 2014/0035805 A1* | 2/2014 | Minnen | | G06V 40/107 345/156 |
| 2014/0049417 A1* | 2/2014 | Abdurrahman | | G08C 17/02 341/176 |
| 2014/0140590 A1* | 5/2014 | Wilson | | G06V 40/10 382/128 |
| 2014/0145929 A1* | 5/2014 | Minnen | | G06V 40/20 345/156 |
| 2014/0354537 A1* | 12/2014 | Park | | G06F 3/017 345/156 |
| 2015/0054729 A1* | 2/2015 | Minnen | | G06V 40/20 345/156 |
| 2015/0063661 A1* | 3/2015 | Lee | | G06V 40/107 382/124 |
| 2015/0070792 A1* | 3/2015 | Terajima | | G02B 7/08 359/824 |
| 2015/0138078 A1* | 5/2015 | Krupka | | G06F 3/017 345/156 |
| 2015/0248235 A1* | 9/2015 | Offenberg | | G06F 3/0237 715/773 |
| 2016/0078289 A1* | 3/2016 | Michel | | G06T 7/73 345/156 |
| 2016/0119545 A1* | 4/2016 | Shimizu | | G02B 7/08 348/208.13 |
| 2016/0171330 A1* | 6/2016 | Mentese | | G01S 3/7864 348/170 |
| 2016/0203360 A1* | 7/2016 | Alvarez | | G06V 40/28 345/156 |
| 2016/0293143 A1* | 10/2016 | Kanemoto | | G06F 3/0346 |
| 2019/0220098 A1* | 7/2019 | Gupta | | G06F 3/011 |
| 2020/0348627 A1* | 11/2020 | Connor | | H04N 23/695 |

OTHER PUBLICATIONS

Supplementary European Search Report for corresponding EP Patent Application No. 15754414.9 dated Jul. 20, 2017.

* cited by examiner

GESTURE OPERATED WRIST MOUNTED CAMERA SYSTEM

CROSS REFERENCE

This application is a continuation of U.S. patent application Ser. No. 17/690,754, filed Mar. 9, 2022, entitled "GESTURE OPERATED WRIST MOUNT CAMERA SYSTEM", which is a continuation of U.S. patent application Ser. No. 16/363,261, filed on Mar. 25, 2019, entitled "GESTURE OPERATED WRIST MOUNT CAMERA SYSTEM" which is a continuation of U.S. patent application Ser. No. 14/634,674, filed on Feb. 27, 2015, entitled "GESTURE OPERATED WRIST MOUNT CAMERA SYSTEM" which claims the benefit of U.S. Provisional Patent Application No. 61/946,622, filed on Feb. 28, 2014, entitled "GESTURE OPERATED WRIST MOUNTED CAMERA SYSTEM," and U.S. Provisional Patent Application No. 62/101,289, filed on Jan. 8, 2015, entitled "GESTURE OPERATED WRIST MOUNTED CAMERA SYSTEM," which are incorporated herein by reference in their entirety.

FIELD OF THE INVENTION

The present invention relates to wearable devices, and more particularly, to a wearable camera system.

BACKGROUND

Timing and framing are key factors in photography and videography that capture moments. People increasingly want to reduce the time it takes to capture moments. Conventional camera solutions require too much preparation or pre-preparation to take a shot or setup a shot. In addition, conventional solutions rely on mounts, optical and traditional viewfinders, and shutter buttons. Conventional camera solutions include traditional digital pocket cameras or digital single-lens reflex cameras (DSLRs), mounted cameras, smartphones, and wearable computers.

There is a strong need for solutions that effectively and efficiently reduce the time it takes to capture moments through photography and videography. The present invention addresses such a need.

SUMMARY OF THE INVENTION

A system and method for capturing media are disclosed. In a first aspect, the system comprises a wristband device that includes at least one sensor and a camera coupled to the wristband device. The camera is controlled by at least one gesture determined using the at least one sensor.

In a second aspect, the method comprises providing a wristband device that includes at least one sensor, coupling a camera to the wristband device, determining at least one gesture using the at least one sensor, and controlling the camera by using the at least one gesture.

BRIEF DESCRIPTION OF THE DRAWINGS

The accompanying figures illustrate several embodiments of the invention and, together with the description, serve to explain the principles of the invention. One of ordinary skill in the art readily recognizes that the embodiments illustrated in the figures are merely exemplary, and are not intended to limit the scope of the present invention.

DETAILED DESCRIPTION

Figure 1:
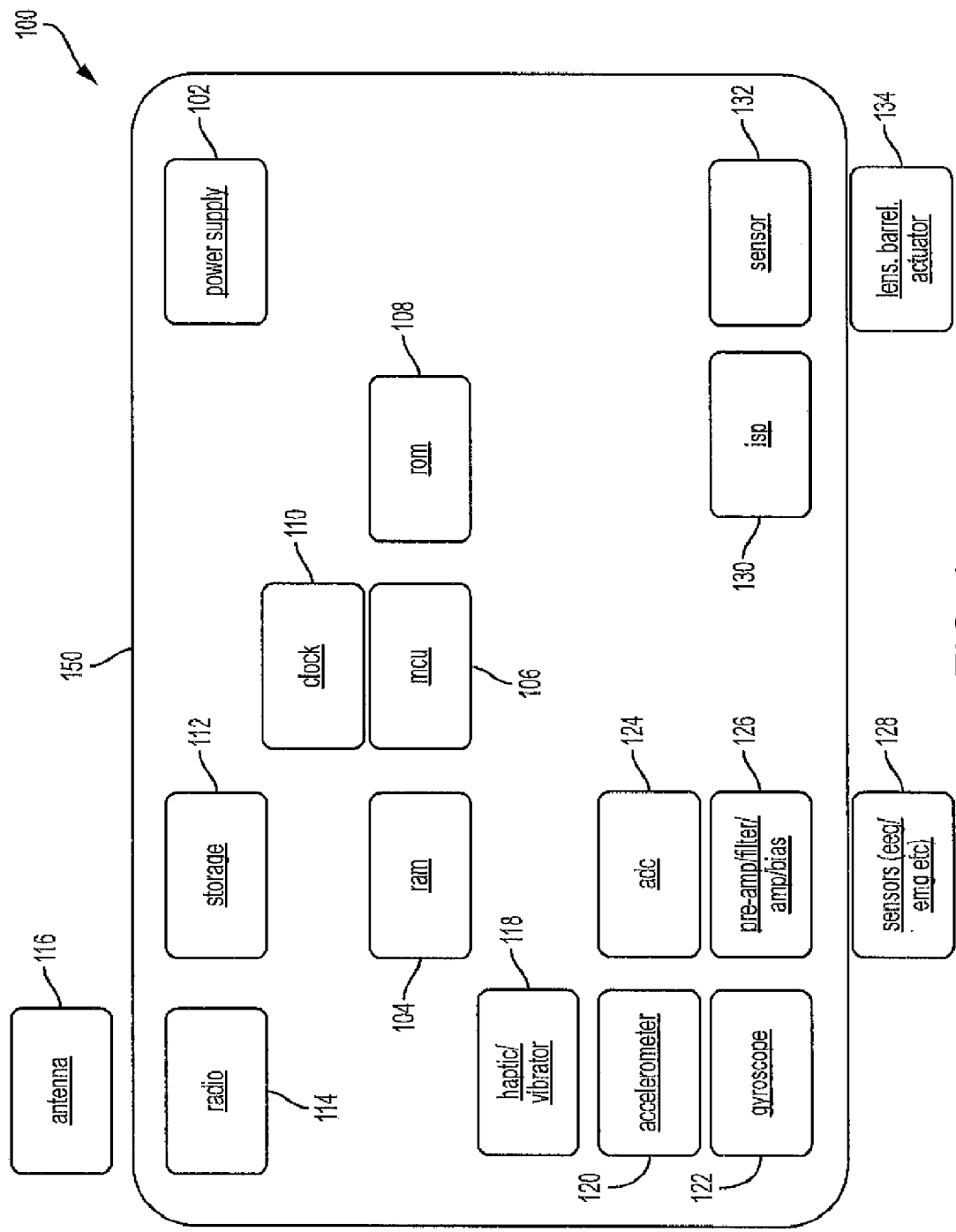
FIG. 1 illustrates a system for capturing media in accordance with an embodiment.

The present invention relates to wearable devices, and more particularly, to a wearable camera system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Traditional camera solutions include digital pocket cameras (e.g., DSLRs), mounted cameras, smartphones, and camera eyeglasses. Traditional camera solutions typically utilize one of three methods for framing a shot. A first method utilizes optical viewfinders which suffer from the drawbacks including but not limited to requiring a user's eye to be in close proximity to an optical window which takes time and is inconvenient. A second method utilizes digital viewfinders which suffer from the drawbacks including but not limited to requiring a digital screen, having a screen size and weight that limits how portable any solution can be, requiring software to display and update the screen which can be slow, requiring power and extra hardware for the screen, and providing an unnatural interface that requires the user to look at a digital representation of what they can see with their own eyes in front of them. A third method utilizes no viewfinder so the user cannot frame a shot before taking it.

In all of the above methods, a user needs to retrieve a camera from storage, look through a viewfinder or struggle to frame a shot, and find and know how to operate the shutter button/mechanism. The camera is typically sized and weighted to be held in the user's hand. However, there is no standard shutter button/mechanism location across traditional camera solutions and retrieving the camera from storage and looking through a viewfinder takes time. These issues are problematic when a user wants to capture media (photos, videos, etc.) related to a moment very quickly.

A system and method in accordance with the present invention addresses the aforementioned issues by providing a wearable camera system (wearable camera device) that is gesture operated and mounted/worn on the wrist of the user. The gesture operated wearable camera device eliminates size, storage, retrieval, and operating knowledge constraints associated with traditional digital cameras. The user of the wearable camera device does not need to retrieve any device or place it into storage (because the device is already worn around the user's wrist), does not need to find and know how to operate the shutter button, and does not need to setup any device by holding or using a mount.

In addition, the gesture operated wearable camera device eliminates constraints associated with traditional mounted cameras. The user of the wearable camera device does not need to use a mount that requires additional time and effort and a receptacle and has a limited range of movement, does not need to predetermine the scope of the framing or use pre-mounting techniques, and does not need to rely on digital or optical viewfinders for framing.

In addition, the gesture operated wearable camera device eliminates constraints and the limited range of motion associated with traditional smartphone cameras. The user of the gesture operated camera system does not need to access or unlock (e.g., using a pattern or passcode) the device before capturing an image, does not need to utilize a specific photo application to capture the image, and does not need to use a device that that is not optimized for photo taking.

In addition, the gesture operated wearable camera device eliminates constraints associated with traditional camera eyeglasses. The user of the gesture operated wearable camera device does not need to utilize a lens fixed to the user's eye or any type of special eyewear, does not obscure the field of view with various actions, and does not include unintuitive camera triggers such as voice commands and winks.

The system and method in accordance with the present invention provides a wearable camera device that utilizes gesture recognition to allow for the user to take high quality photos/video/media quickly and efficiently. The photos and/or video are taken by easily framing the photo at different angles by simply using the user's hand, without the need for a viewfinder, or any contact with hardware in the palm or fingers of the user's hand, or the use of a second/free hand to trigger a shutter button. In one embodiment, the user of the wearable camera device raises an empty hand, gestures with the same hand as if taking a photo with a traditional camera, and captures a photo (or video) within a known framed area. The wearable camera device has the advantage of reducing the amount of time required to prepare, frame, and capture a media (photo/video).

In one embodiment, the wearable camera device comprises a wristband device (band component) and a camera that is either coupled to the wristband device (so that the user could potential upgrade or interchange the type of the camera) or integrated within the wristband device. The wristband device includes a plurality of embedded sensors including but not limited to microelectromechanical systems (MEMS) devices, gyroscopes, accelerometers, pressure sensors, optical sensors, biometric, electromagnetic sensors, and motion sensors that detect user movements and gestures and the wristband also includes a processor device/unit to analyze and classify the detected gestures.

In another embodiment, the wearable camera device comprises a glove-like device that is in contact with the user's fingers and a mounted camera coupled to the glove-like device. In this device, the wearable camera device does not include a wristband device portion and the sensor and processor and computing components are instead housed in the glove-like device that is worn by the user like a typical glove.

In one embodiment, the camera is small in size and lightweight. The camera includes a camera lens. In one embodiment, the camera lens is any of thumbnail sized, nano sized, the size of the tip of a pen, the size of a traditional camera lens located on a smartphone, and other small sizes. In another embodiment, the camera lens is smaller than thumbnail sized. In one embodiment, the camera is interchangeable with various types of lens so that the user can upgrade the wearable camera device. In one embodiment, the wristband device is interchanged with different colors and patterns and jewelry pieces to enable customizability.

In one embodiment, the camera with camera lens is coupled to the wristband device and positioned near the wrist in a manner that allows the camera lens to fluidly, automatically, and continuously follow the movement and/or rotation of the user's wrist. In one embodiment, the camera lens is flexibly fixed to the wristband device near the outer edge of the user's hand. This allows the camera lens to move in line with the wrist when rotated or when the hand is moved.

In another embodiment, the camera lens is rigidly fixed to a portion of the wristband device and is actuated electromechanically by electrical signals from the wristband device that are generated in response to wrist or hand movements that are detected by MEMS devices and sensors embedded within the wristband device.

The wristband device recognizes arm, wrist, hand, and finger gestures based on a variety of techniques by monitoring, filtering and detecting, classifying, and processing muscle movements, tendon movements, bone movements, wrist shape changes, hand shape shapes, finger shape changes, and/or bioelectromagnetics states, other user movements and changes to provide for sensor signal detection, feature extraction, and gesture recognition functionalities.

In one embodiment, the wristband device utilizes wrist contour biometrics and a contour mapping mechanism as a primary input for gesture recognition. In another embodiment, additional sensors that detect additional inputs and sensor data are utilized by the wristband device to determine the gestures and perform the gesture recognition. In one embodiment, firmware running on an embedded system in the wristband device can monitor, filter, feature extract, classify, and interpret recognized gestures, and then transmit the recognized gestures as camera firmware commands to the camera to control the camera firmware, hardware components, and electromechanical functions of the camera.

At a certain time point (N), the user's hand that is wearing the wristband device, the user's fingers, and the user's wrist are all oriented in particular orientations. When the hand, wrist, or fingers of the user are moved or change position, then the muscles/tendons contract and/or relax, and the bones and skin of the user also move or change/shift positions. These changes can result in physical anatomical changes on the surface of the wrist or cause bioelectromagnetics changes and the changes are recorded by the contour mapping mechanism to control the camera.

In one embodiment, the wristband device or band includes sensor arrays that are spaced apart from each other at predetermined distances and with known pitches so that the sensor arrays completely circumvent the user's wrist. In another embodiment, the wristband device includes sensor arrays that do not completely circumvent the user's wrist and instead are focused on a certain location or region. The sensor arrays either measure distance to the surface of the wrist or measure the pressure that the wrist exerts at each sensor position. Analog-to-digital converters (ADCs) then convert sensor signals detected by the sensor arrays to an array of values. The array of values that are collected from the user's wrist by the wristband device are a representation of the state of the user's wrist, hand, and fingers at the time point N.

The array of values are then filtered by the wristband device using a plurality of filters including but not limited to median filters and infinite impulse (IIR) filters to reduce/eliminate noise and motion artifacts, and extract/retain features that meet certain thresholds within a known tolerance criteria (i.e., distance or pressure measurement+/−some acceptable error at each sensor position). Once the wristband device filters the signals to extract features, the features are classified using sensor data classification.

In one embodiment, the wristband device includes a sensor data classification unit that includes pre-defined or pre-determined classifiers that contain features sets per each recognized gesture (e.g., particular arrangement of the user's wrist, hand, and/or fingers). In one embodiment, the pre-defined classifiers and feature sets are pre-loaded in the wristband device's firmware from reduced training sets that are previously collected from sufficiently large and diverse training population data.

In another embodiment, the pre-defined classifiers and feature sets are collected in real-time from a cloud-based database that stores data related to all of the users that are using the wearable camera device. In another embodiment, the pre-defined classifiers and feature sets are trained based on the current wearer/user of the wearable camera device over a predetermined time period. Training includes but is not limited to machine learning techniques, device feedback, and user feedback.

Once the wristband device classifies a set of extracted features as matching at least one known gesture from a plurality of recognized gestures (e.g., user gestures related to controlling the camera of the wearable camera device), firmware of the wristband device issues a command/callback to either the firmware of the wristband device to perform an action by the wristband device (e.g., dismissing an alert or notification, uploading data to cloud storage, etc.) or to the firmware of the camera to perform a camera-related action by the camera (e.g., taking a photo, controlling camera shutter, changing camera modes, actuating the camera lens, etc.).

In one embodiment, the wristband device detects an array of sensor data values associated with user movements at a frequency of K. Based on the detected array of values and subsequent feature extraction and gesture recognition, a sequence of commands at time point N are extracted from the recognized gestures and are classified at events N+1/K, N+1/K*2, N+1/K*3, etc. These events are processed continuously in a loop to provide constant command control to the wearable camera device. Other embodiments may use additional sensors including but not limited to Biometric electroencephalography (EEG) magnetoencephalography (MEG) sensors, and electromyography (EMG) sensors in combination with pressure and optical sensors to reduce noise, false positive features, or misclassification of gestures and commands.

In one embodiment, the wristband device monitors movements from the user's arm, wrist, hand, fingers, and thumb. When the user is ready to take a photo or video, the user's hand with the wearable camera device is raised and positioned to frame the photo/video. Once the user's hand is raised and the photo/video is framed by the user's hand, a photo/video (media) can be captured by a plurality of finger movements and gestures recognized by the wearable camera device.

In one embodiment, the index finger and thumb are extended, approximately 90 degrees from each other, effectively creating one corner of a camera frame. In another embodiment, varying angles and positions between the user's fingers or the index finger and thumb are possible to create the camera frame while increasing usability and minimizing potential user fatigue. For example, the user can hold up all four fingers and extend the thumb approximately 90 degrees from the four fingers to frame the camera or the user can merely hold up one finger to frame the photo/video. One of ordinary skill in the art readily recognizes that a plurality of user movements and gestures can be associated with a plurality of wearable camera device functions and that would be within the spirit and the scope of the present invention.

In the embodiment where the user has extended his/her index finger and thumb approximately 90 degrees from each other, the position of the shutter plane is always substantially parallel to the plane created by the index finger and the thumb—even when the user's wrist is rotated. In this embodiment, the wristband device can detect the extended index finger and thumb by monitoring, processing, classifying, and recognizing muscle, tendon, and wrist movements, wrist contours, hand shapes, and movements using feature extraction and gesture recognition to control the camera.

Once the wristband device has detected that the user has extended his/her index finger and thumb approximately 90 degrees from each other (or that the user has positioned his/her hand/fingers in another orientation associated with certain gestures), the wristband device transmits an instruction/command/call to the camera to open the shutter and wait in a ready state to take/capture a photo or video.

In one embodiment, the user gestures with the index finger and simulates a button press by slightly contracting the extended finger. In another embodiment, the user gestures with his/her finger to "flick" or "point" to the subject. The wristband device recognizes these gestures as a camera trigger gesture by monitoring, classifying, and extracting features from the finger and wrist movements using the plurality of embedded sensors that collects/detects muscle, tendon, bioelectromagnetics, and anatomical contour changes and the processor device that utilizes algorithms (e.g., machine learning classifiers) to analyze and classify the detected movements.

In this embodiment, the wristband device triggers the camera to capture a photo or video in response to the detected movements that are classified as a camera trigger gesture. In another embodiment, the wristband device detects other gestures for camera-related functions such as capturing photos/videos, changing/selecting operation modes, zooming in/out, etc.

In one embodiment, the operation modes include but are not limited to adjusting the lens position by rotating the wristband device around the wrist. In one embodiment, the wristband device has a light emitting user interface (UI) that is sized to be displayed on the user's wrist and that can be manipulated either by the detected user movements/gestures or by direct user touch gestures on a display screen of the Ul. The Ul can be either smaller than traditional video displays, similarly sized, or larger. The Ul can be an LCD display, LED display, or another type of display unit.

In one embodiment, the wearable camera device or the wristband device itself includes a communication device (e.g., WiFi or Bluetooth receiver and transmitter) that includes any of WiFi and Bluetooth communication capabilities so that the sensor movement data that is detected and analyzed as well as the captured photos and videos can be wirelessly communicated to another device (e.g., smartphone, laptop, etc.) or to a cloud-computing storage system by the communication device. The captured photos and videos can be automatically transmitted (or transmitted according to a predetermined schedule) to the device or cloud-computing storage system so that the user's information is seamlessly backed up.

In one embodiment, the wristband device can be used in conjunction with a second wristband device on the user's opposing hand. The first and the second wristband devices can communicate different modes, operations, and data to each other and also work in conjunction as a multi-camera system. The multi-camera system can include additional gesture recognitions and features to enable advanced photo and video taking including but not limited to panorama photos/videos and 3D photos/videos.

The system and method in accordance with the present invention provide a gestured operated wrist-mounted camera system (wearable camera device) that is an unobtrusive accessory-type wristband camera that can be worn by the user for 24 hours a day so that the user can capture moments at any time or place. Therefore, the wearable camera device is convenient and quickly produces high quality and framed camera shots. The need for a physical viewfinder (either optical or digital), a shutter button, and command and control buttons is eliminated. Readying, framing, sizing, and shutter operations do not require physical buttons. The user can also personalize the wearable camera device by selecting a plurality of different styles, colors, designs, and patterns associated with the wristband.

The form factor of the wearable camera device provides camera hardware that is integrated into the wristband device so there is no need for costly hardware (physical or digital screen) or a viewfinder which reduces the footprint (size, power, complexity). The wristband device is form-fitting and adjustable and can include a small adjustable positioned camera and lens. In another embodiment, the wristband device includes a display unit that can serve as a viewfinder for added functionality.

In one embodiment, the camera is coupled to the wristband device at the junction of the pisiform and ulna. In another embodiment, the camera is coupled to the wristband device at or near the edge of an abductor digit minima. These positions allow for the plane of the field of view created naturally by the index finger and thumb (or other user's hand/finger orientations) to be parallel with the camera lens even when the wrist is maneuvered and rotated at any angle (eliminating any potential obstructions). In another embodiment, the position of the camera lens is electromechanically moveable to align with the movement of the hand and wrist.

The wearable camera device is able to monitor, recognize and interpret arm, wrist, hand, and finger gestures, movements, and changes by monitoring, detecting, processing, and classifying muscle movements, tendon movements, hand shapes, and wrist contours using feature extractions and gesture recognition. In one embodiment, the gestures that the wearable camera device can detect to initialize, ready the camera, and take photos and/or videos include but are not limited to a semicircle shape, circle shape, OK action, hang loose action, swipe left across index finger, swipe right across index finger, tap or double tap between fingers, tap or double tap across index finger, 90 degree framing, corner box framing, double view framing, framing, switching modes of operation (camera to video, etc.), traversing modes and options, selecting options, triggering a shutter, starting capture, motion capture, encoding, and zooming in/out.

The wristband device can include features outside of camera functionality, processing, and wireless communication including but not limited to a clock, timer, and Internet/email capabilities. In one embodiment, the wristband device includes an adjustable or rotatable (around the wrist) camera lens position and multiple lenses on the wristband (e.g., front, rear, facing, etc). In one embodiment, the wristband device includes perforations along the outside of the band that can emit light (e.g., light-emitting diodes or LEDs) to notify the user with different patterns, shapes, and designs that act as an interface display to provide feedback information to the user (e.g., photo taken, photo uploaded to cloud storage, error in taking photo, etc.). The LED display and patterns can be programmable by the user or predetermined.

In one embodiment, the wristband device is touch enabled to allow for touch gestures to be recognized directly on the wristband device (or the display unit of the wristband device) in addition to muscle, tendon, and bioelectromagnetics recognition. In one embodiment, the wristband device includes the ability to tap, drag, and flick (away) the emitted light based notifications and objects around the outer portion of the wristband. This allows the user to manipulate and adjust the position of the emitted display, to control the notifications once they are no longer relevant to the user, and to respond to certain notifications with various input, touch, and gesture responses.

In one embodiment, the wristband device includes the ability to manipulate modes of operation, options, and the interface display by performing a gesture with only one hand (palm free). In one embodiment, the wristband device includes at least one accelerometer to aid in framing the shots and with orientation. In one embodiment, the wristband device includes a vibration sensor that can vibrate as part of the interface display that provides feedback to the user (in addition to the LED notifications). In one embodiment, the wristband device includes a speaker with audio output as part of the interface display so that additional feedback (in audio format) can be provided.

In one embodiment, the wristband device includes a plurality of sensors that are embedded within and connected via circuitry to detect various data from the user and the user's surrounding environment. The plurality of sensors can include but are not limited to any of or any combination of MEMS devices, gyroscopes, accelerometers, torque sensors, weight sensors, pressure sensors, magnetometers, temperature sensors, light sensors, cameras, microphones, GPS, wireless detection sensors, altitude sensors, blood pressure sensors, heart rate sensors, biometric sensors, radio frequently identification (RFID), near field communication (NFC), mobile communication, Wi-Fi, strain gauges, fingerprint sensors, smell sensors, gas sensors, chemical sensors, color sensors, sound sensors, acoustic sensors, ultraviolet sensors, electric field sensors, magnetic field sensors, gravity sensors, wind speed sensors, wind direction sensors, compass sensors, geo-locator sensors, polarized light sensors, infrared emitter sensors, and photo-reflective sensors.

In one embodiment, the wristband device includes a processor device that analyzes the detected sensor data (from the plurality of sensors) using a sensor data classification unit that utilizes a plurality of algorithmic processes. The plurality of algorithmic processes can include but is not limited to any of or any combination of back propagation, bayes networks, machine learning, deep learning, neural networks, fuzzy mean max neural networks, hidden Markov chains, hierarchical temporal memory, k nearest neighbor (KNN), adaboot, and histogram analysis.

In one embodiment, the user utilizes a plurality of wristband devices worn on both hands. In this embodiment, wireless communication and synchronization between the plurality of wristband devices can provide multi-camera functionality including but not limited to any of new framing options, larger framing areas, 30 capability, and 360 degree capability. In one embodiment, the wearable camera device includes a capability of connecting to various networks (public or private).

To describe the features of the present invention in more detail, refer now to the following description in conjunction with the accompanying Figures.

FIG. 1 illustrates a system 100 for capturing media in accordance with an embodiment. The media can include photos, video, and/or other types of media. The system 100 is a wearable camera device that includes a wristband device 150 and a camera 134 coupled to the wristband device 150. The camera 134 comprises a lens, a barrel, and an actuator. In one embodiment, the wristband device 150 includes a plurality of components including but not limited to any of a power supply 102, a random access memory (RAM) 104, microcontroller (MCU) 106, read-only memory (ROM) 108, a clock 110, a storage/memory device 112 (including but not limited to Flash memory), a radio 114 (including but not limited to Bluetooth and WiFi), an antenna 116, a haptic/vibrator sensor 118, an accelerometer 120, a gyroscope 122, an analog-to-digital converter (ADC) 124, pre-amplifier/filter/amplifier/bias device 126, a plurality of external sensors 128 (e.g., EKG, EEG, MEG, EMG, pressure, optical, etc.), an in-system programming component (ISP) 130, and an internal sensor 132. In another embodiment, the embedded accelerometer 120 and gyroscope 122 are included in the plurality of external sensors. In another embodiment, the wristband device includes a processor, a memory device, an application, and a transmitter/receiver device.

The plurality of external sensors 128 detect user movements (e.g., muscle or tendon movements) and the plurality of components of the wristband device 150 determine a plurality of gestures by monitoring, classifying, and extracting features from the detected user movements. The plurality of gestures control various actions that are executed by either the wristband device 150 itself or the camera 134 including but not limited to taking pictures or videos, scrolling through various options, and scrolling through various modes.

Figure 2:
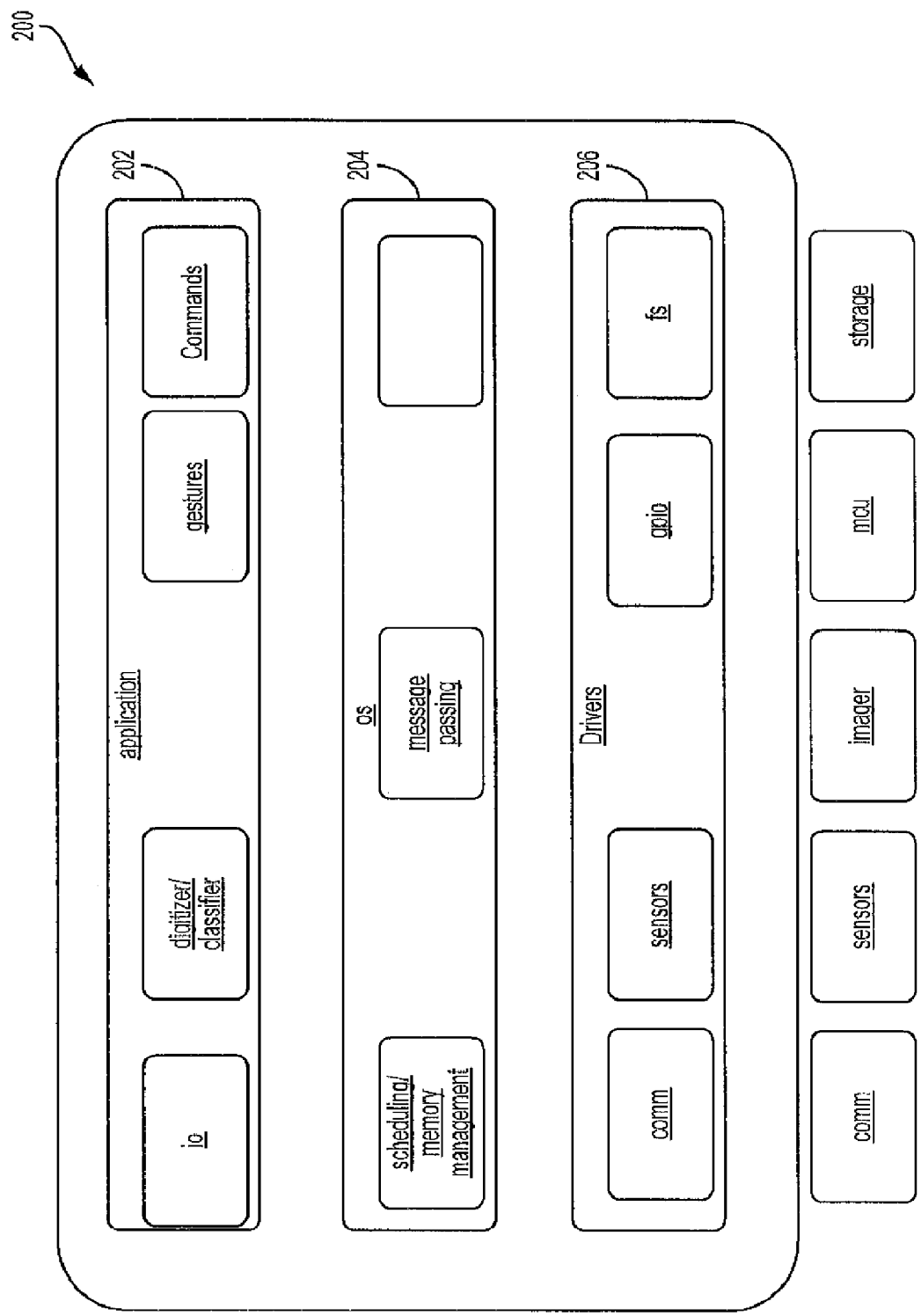
FIG. 2 illustrates a system for sensor data classification by a wearable camera device in accordance with an embodiment.

FIG. 2 illustrates a system 200 for sensor data classification by a wearable camera device in accordance with an embodiment. The system 200 includes an application component 202, an operating system (OS) component 204, and a plurality of drivers 206. In one embodiment, the application component 202 includes inputs/outputs (I/O), a digitizer/classifier, a gesture detection component, a sensor data classification unit, and a commands component. In one embodiment, the OS 204 includes a scheduling/memory management component and a message passing component. In one embodiment, the each driver of a plurality of drivers 206 may include communication drivers, sensor drivers, general purpose I/O (GPIO) drivers, and file system (FS) drivers. In one embodiment, the system 200 detects user movements using the sensors of the wristband device and processes the detected user movements using the application component 202 and the sensor data classification unit to determine the gestures and associated commands that control the camera.

Figure 3:
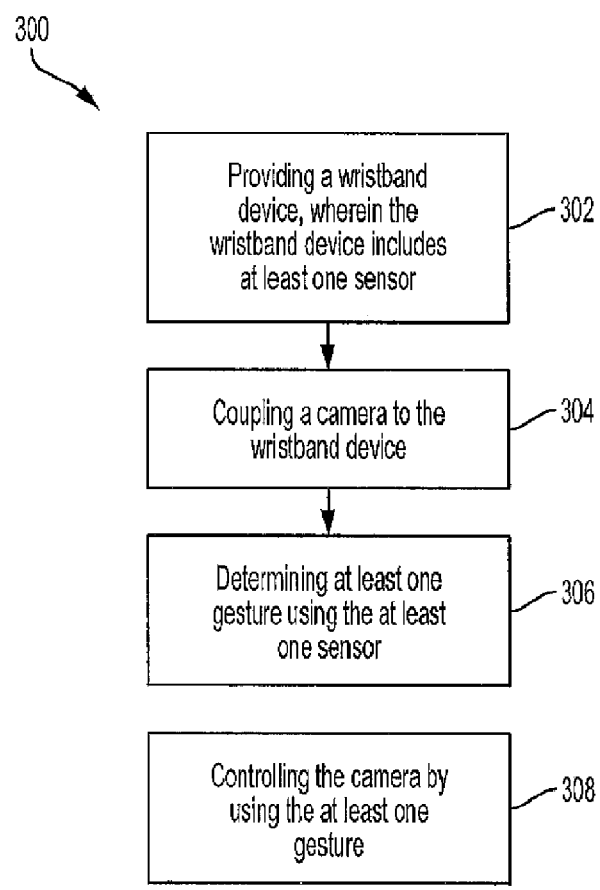
FIG. 3 illustrates a method for capturing media in accordance with an embodiment.

FIG. 3 illustrates a method 300 for capturing media in accordance with an embodiment. The media can include photos, video, and/or other types of media. The method 300 comprises providing a wristband device that includes at least one sensor, via step 302, coupling a camera to the wristband device, via step 304, determining at least one gesture using the at least one sensor, via step 306, and controlling the camera by using the at least one gesture, via step 308.

In one embodiment, the method further includes detecting, by the at least one sensor, user movements by using any of muscle, tendon, bioelectromagnetics, and anatomical contour changes (using the contour mapping mechanism) of a user. A processor of the wristband device then analyzes the user movements using the sensor data classification unit to extract features from the user movements and to determine at least one gesture from the extracted features using various classifiers. For example, if the detected user movement is determined to be the at least one gesture of a user extending an index finger and thumb approximately 90 degrees from each other, the wristband device will instruct/control the camera to open a shutter and await the photo/video capture.

Once the wristband device determines an additional gesture when the user simulates a button pressing by slightly contracting the index finger, the wristband device transmits an instruction to the camera to trigger the shutter thereby capturing the media (photo/video). In one embodiment, a communication device is coupled to both the wristband device and the camera, wherein the communication device transmits data from both the wristband device (e.g., gesture classifications) and the camera (e.g., photos and videos) to another device that comprises any of a smartphone, a laptop, a desktop, and a cloud-based server system.

Figure 4:
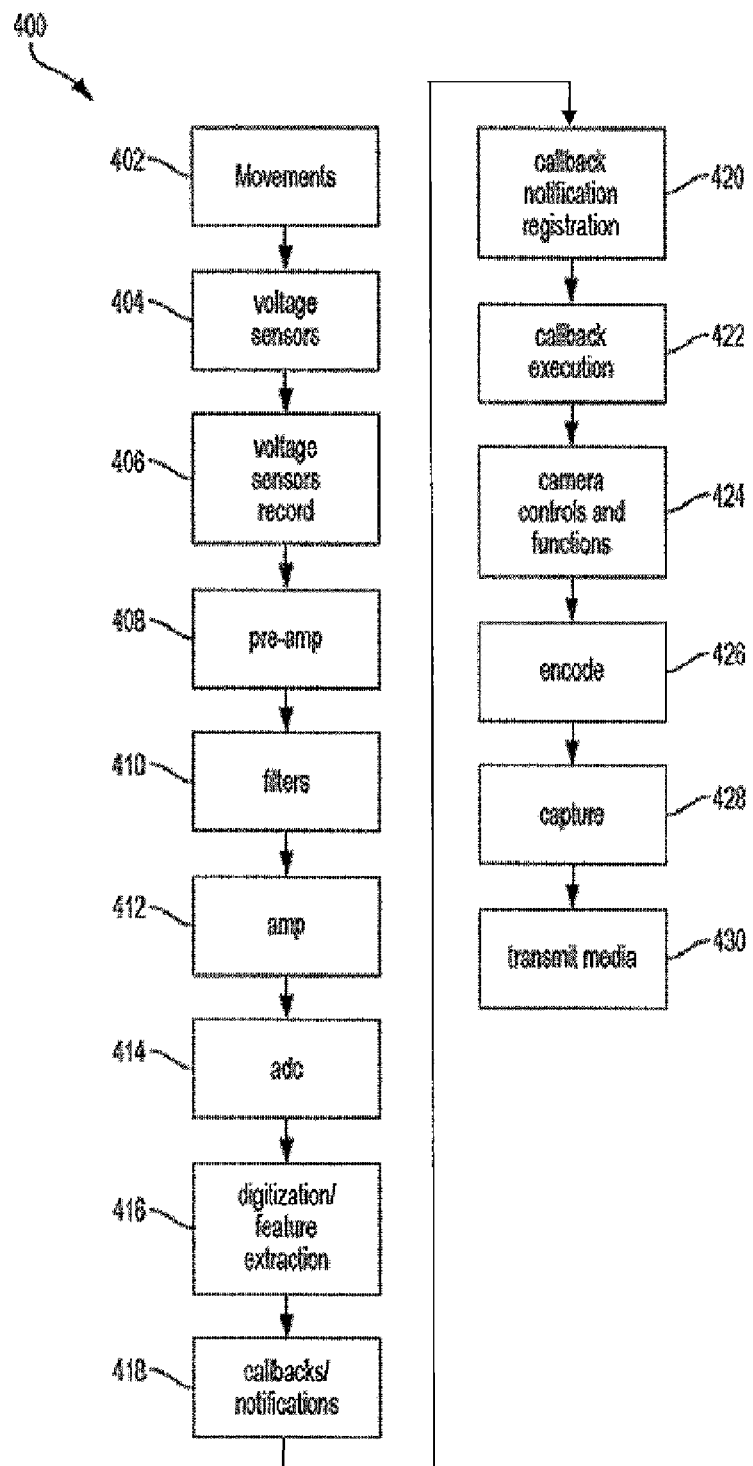
FIG. 4 illustrates a method for capturing media in accordance with another embodiment.

FIG. 4 illustrates a method 400 for capturing media in accordance with another embodiment. The media can include photos, video, and/or other types of media. The method 400 comprises movements of a user using the wearable camera device occurring, via step 402, voltage sensors detecting the user movements, via step 404, the voltage sensors recording the detected user movements as a signal, via step 406, the signal passing through a pre-amplifier, via step 408, the pre-amplified signal passing through a plurality of filters to remove noise and additional motion artifacts, via step 410, the filtered signal passing through an amplifier, via step 412, and the amplified signal passing through an analog-to-digital converter (ADC), via step 414.

The filtered, amplified, and converted signal has features extracted from it, via step 416, and these feature extractions result in gesture determinations and associated instructions, callbacks, and notifications, via step 418. The callbacks and notifications are registered by the wearable camera device, via step 420, and the instructions or callbacks are transmitted from the wristband device to the camera for execution, via step 422, which sets up certain camera controls and functions (e.g., taking a photo/video), via step 424. The controls and functions are encoded, via step 426, which results in the triggering of the associated camera function (e.g., data capture), via step 428, and the wearable camera device then transmits the captured media, via step 430.

Figure 5:
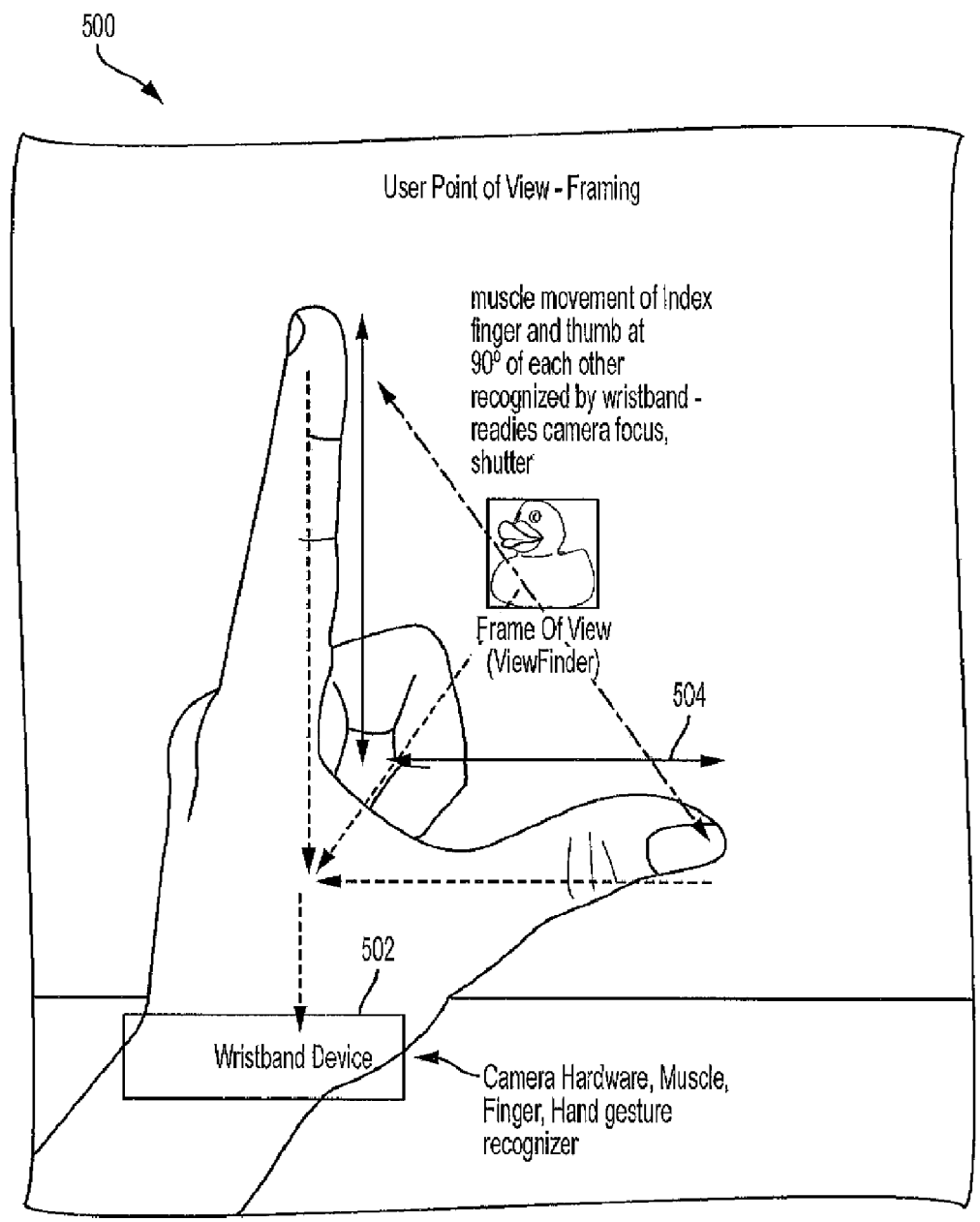
FIG. 5 illustrates a user point of view of a wearable camera device in accordance with an embodiment.

FIG. 5 illustrates a user point of view of a wearable camera device 500 in accordance with an embodiment. The wearable camera device 500 includes a wristband device 502 that is coupled to a camera (or the camera is embedded within the wristband device 502). The wristband device 502 also includes other hardware components and a muscle, tendon, finger gesture recognizer or sensor detection device. The wearable camera device 500 is shown from the user's point of view when framing a photo/video and includes a frame of view 504 that serves as the user's viewfinder (in place of traditional digital or optical viewfinders). In this embodiment, the wearable camera device 500 does not include a traditional optical or digital viewfinder which allows the user greater flexibility in taking nature photos and videos by using the frame of view 504.

In another embodiment, a viewfinder is displayed on a display unit/screen (e.g., LCD/LED screen) of the user interface (UI) of the wristband device. In this embodiment, as the user focuses on a subject using his/her fingers/hand to frame the subject, the user can verify the correct frame has been captured by checking the display unit of the wristband device that displays the signal from the camera lens.

In the diagram 500, the user's index finger and thumb are extended approximately 90 degrees from each other to frame the subject. In another embodiment, varying angles and positions between the user's fingers or the index finger and thumb are possible to create the camera frame while increasing usability and minimizing potential user fatigue. Once the user extends his/her fingers in this shape (index finger and thumb go degrees from each other), the wristband's internal sensors detect the user movements and shapes (orientation of the index finger relative to the thumb) as a muscle movement. The detected muscle movement is determined to be a certain gesture that readies the camera focus and shutter. The wearable camera device 500 then awaits another detected user movement that is determined to be a certain gesture that will trigger another camera action (such as taking the photo/video).

In another embodiment, the user wearing the wearable camera device faces his/her palm outwards and towards the subject with all four fingers raised (and possibly extending the thumb approximately 90 degrees from the four fingers or resting the thumb up against the index finger). In this embodiment, if the user lowered one or more of the four raised fingers, then the wristband device would detect user movements, determine a gesture from the detected user movements, and then transmit a command/instruction to the camera based upon the determined gesture to carry out a camera action including but not limited to triggering a camera shutter action. In another embodiment, the user wears the wearable camera device (or specifically the wristband device portion) at a position that is rotated 180 degrees or the opposite of the normal wearing position. In this embodiment, the camera lens is facing the user thereby allowing the user to take "selfie" style captures using similar user movements and gestures (e.g., lowering one of the fingers that are raised, etc.).

Figure 6:
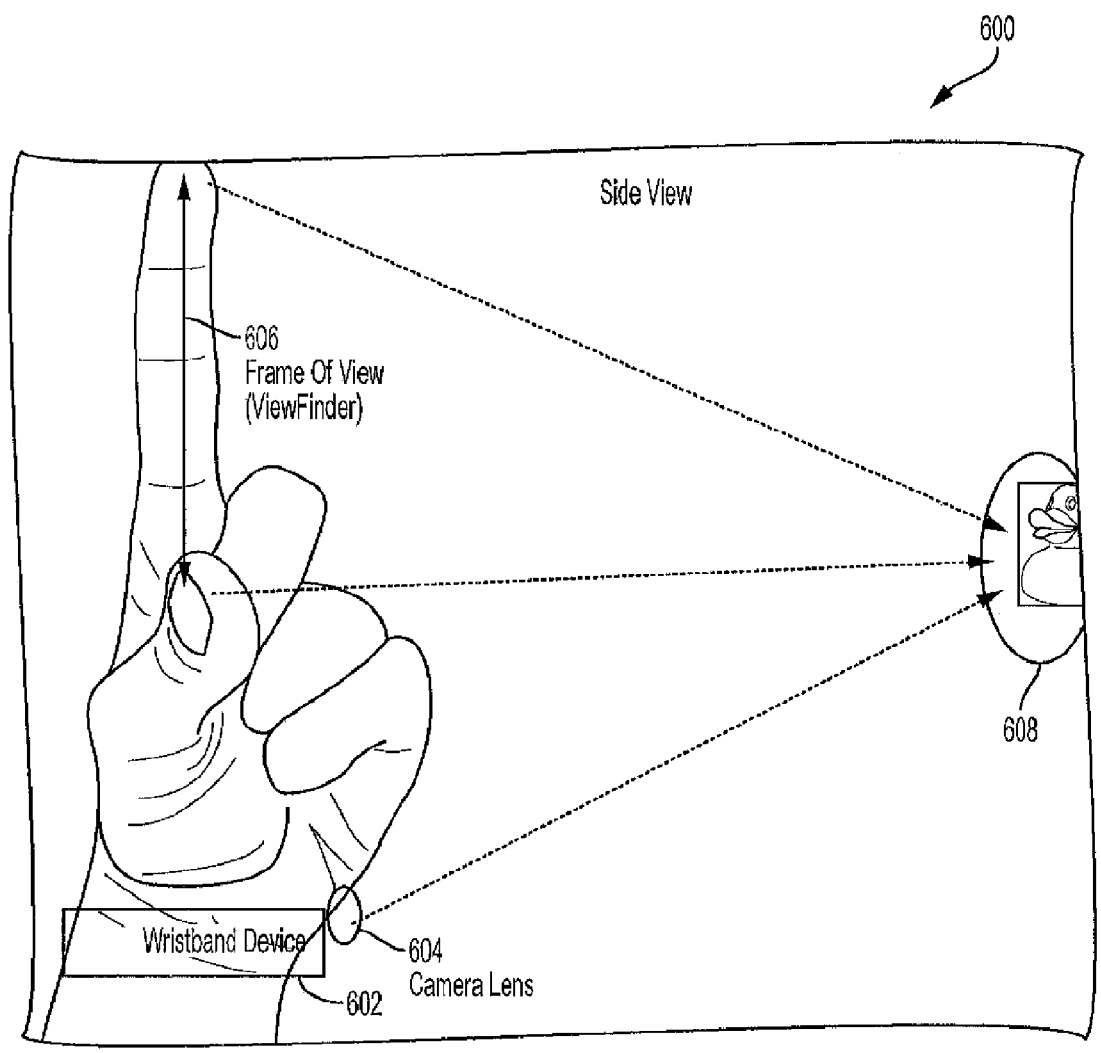
FIG. 6 illustrates a side view of the wearable camera device in accordance with an embodiment.

FIG. 6 illustrates a side view of the wearable camera device 600 in accordance with an embodiment. The wearable camera device 600 has components similar to the wearable camera device 500 of FIG. 5 including a wristband device 602 and a camera coupled to the wristband device 602. The camera includes a camera lens 604 focused on an object 608. The frame of view 606 is focused on the object 608. The user's index finger and thumb are in the same position (extended approximately 90 degrees from each other) and so the camera is once again in a ready position for when another user movement and associated gestured is determined.

Figure 7:
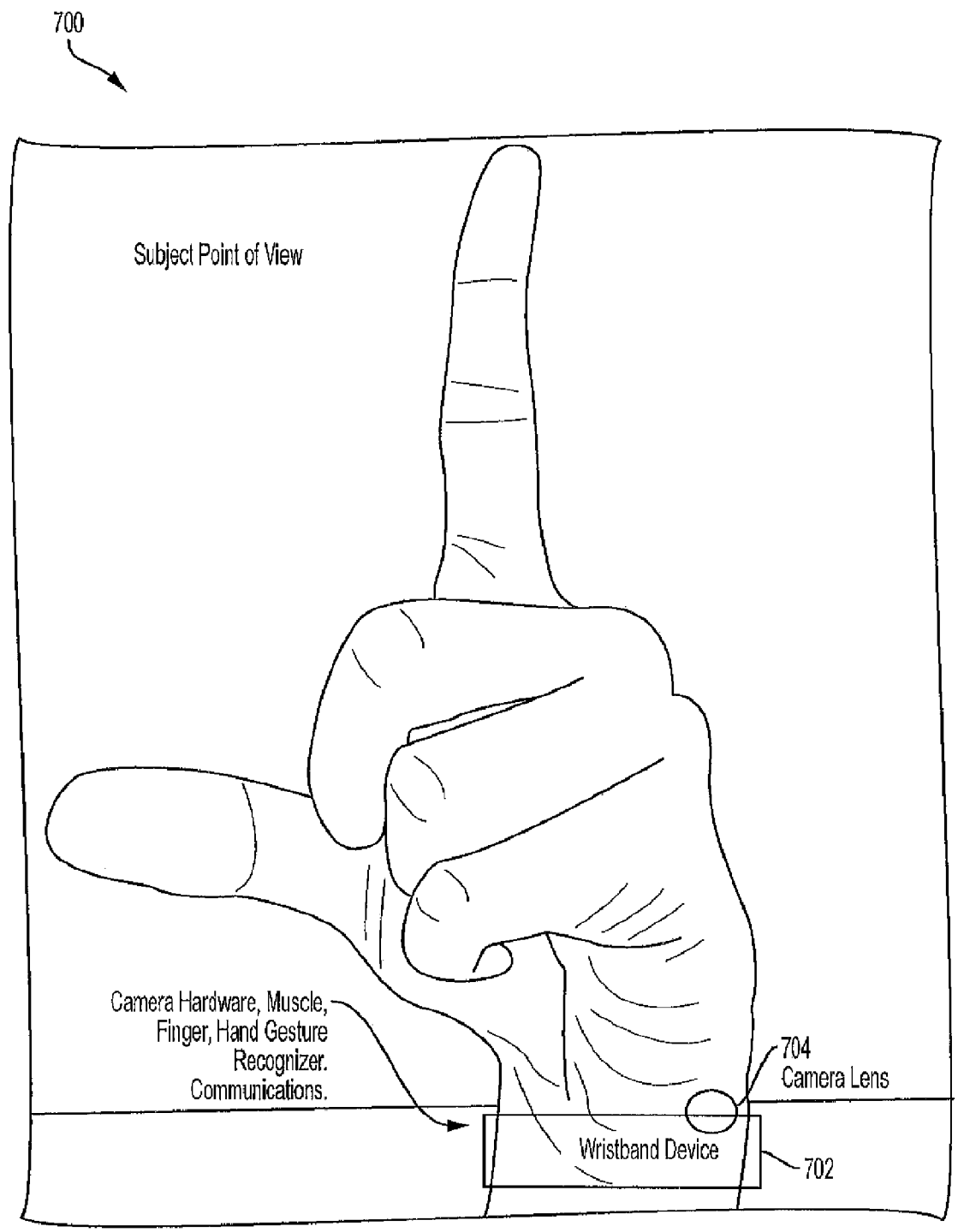
FIG. 7 illustrates a subject point of view of the wearable camera device in accordance with an embodiment.

FIG. 7 illustrates a subject point of view of the wearable camera device 700 in accordance with an embodiment. The wearable camera device 700 has components similar to the wearable camera device 500 of FIG. 5 including a wristband device 702 and a camera coupled to the wristband device 702. The camera includes a camera lens 704. The user's index finger and thumb are in the same position (extended approximately 90 degrees from each other) and so the camera is once again in a ready position for when another user movement and associated gestured is determined.

Figure 8:
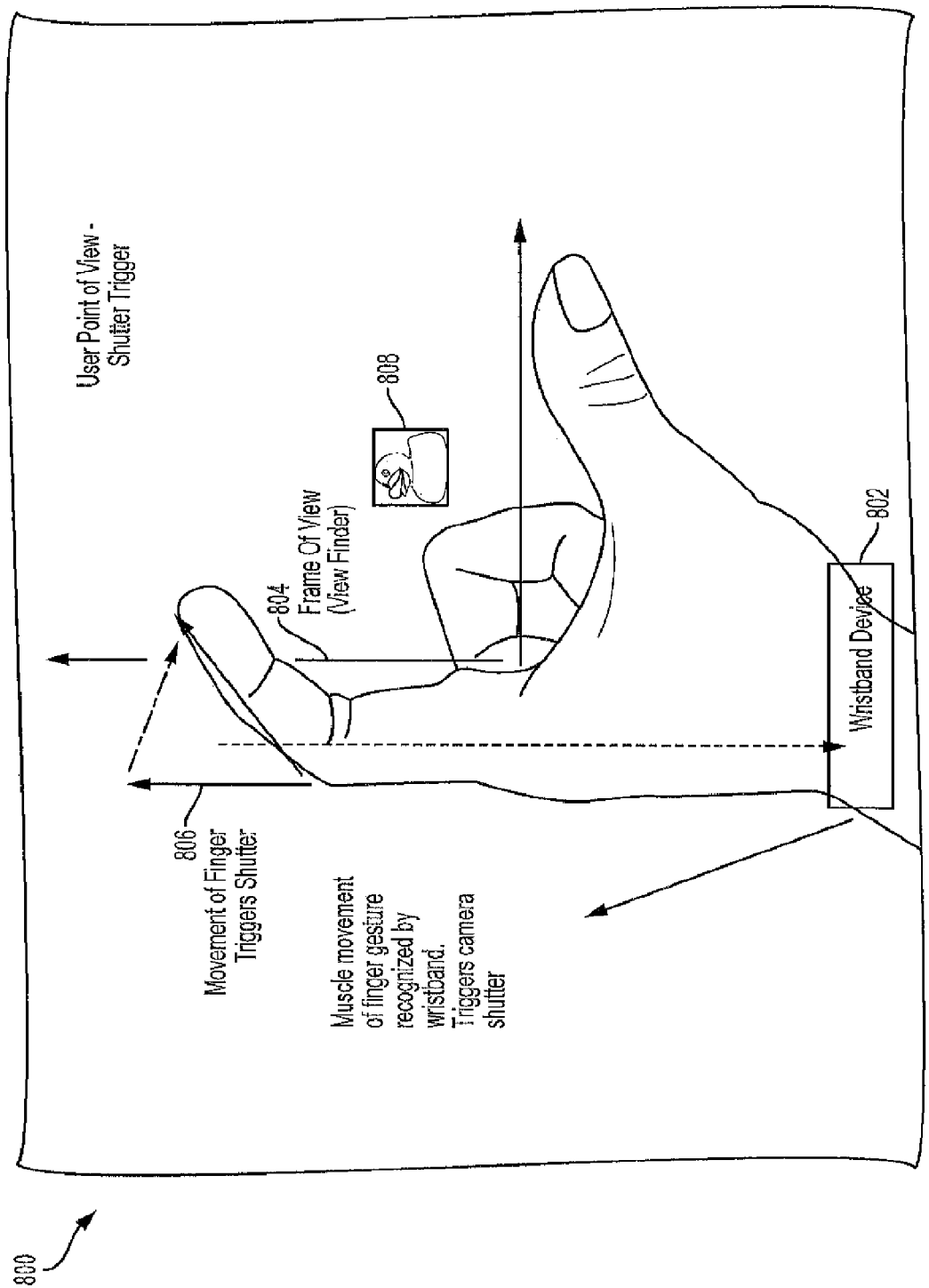
FIG. 8 illustrates a user point of view of the wearable camera device in accordance with an embodiment.

FIG. 8 illustrates a user point of view of the wearable camera device 800 in accordance with an embodiment. The wearable camera device 800 has components similar to the wearable camera device 500 of FIG. 5 including a wristband device 802 and a camera coupled to or integrated within the wristband device 802. The user's index finger and thumb have moved from the position of being extended approximately 90 degrees from each other to a button pressing simulation movement 806. In this embodiment, the button pressing simulation movement 806 is when the user's index finger is slightly lowered. In another embodiment, a different type of user movement can be associated with the button pressing simulation movement 806.

Once the user's index finger moves, the wristband device 502's sensors detect the user movement and the wristband device 502's internal components and sensor data classification unit determine that a specific gesture associated with the detected user movement has occurred. The determined gesture prompts the camera to take a picture/photo of an object 808 in the distance that is framed by a frame of view 804.

Figure 9:
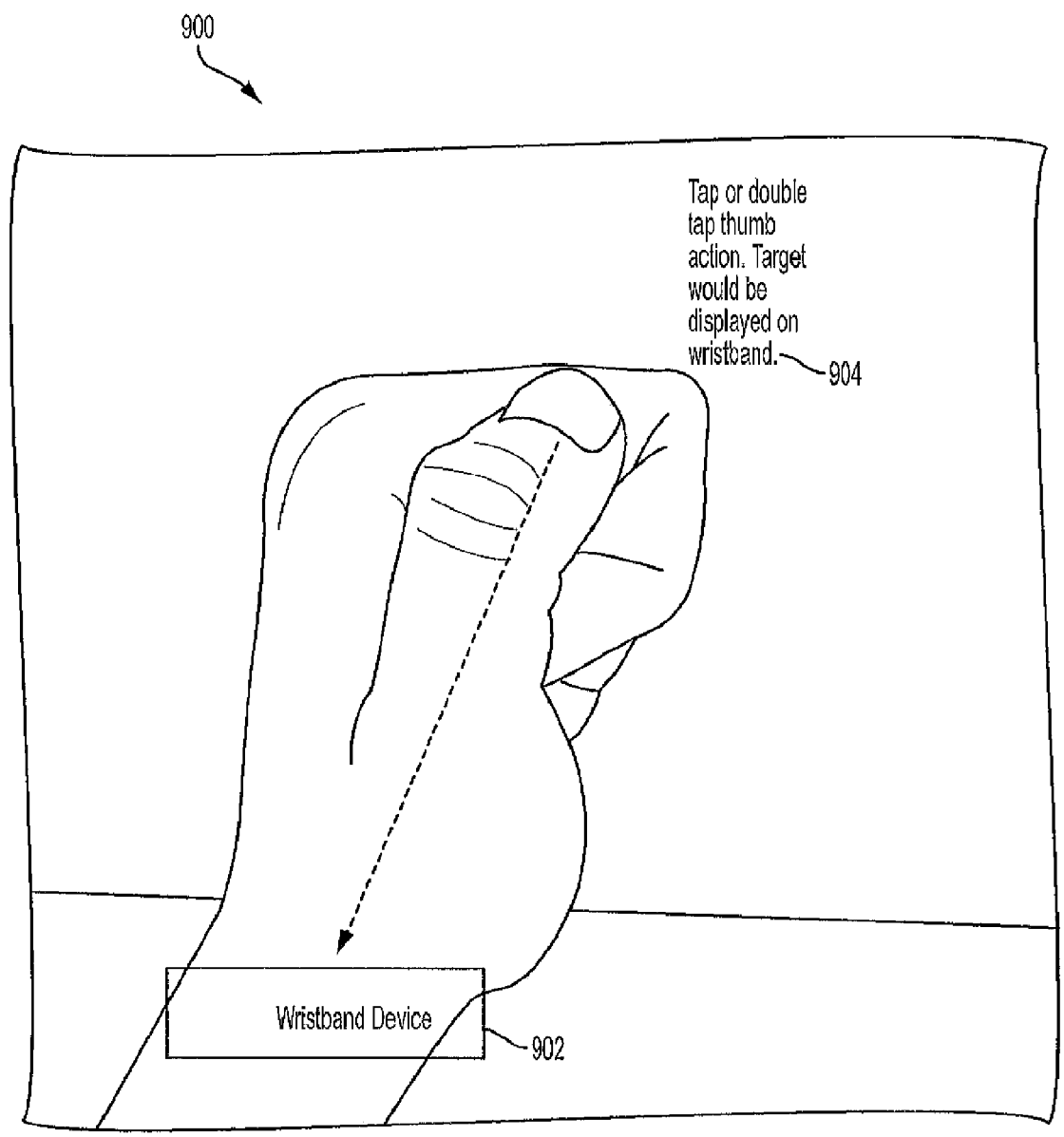
FIG. 9 illustrates a user point of view of the wearable camera device in accordance with an embodiment.
Figure 10:
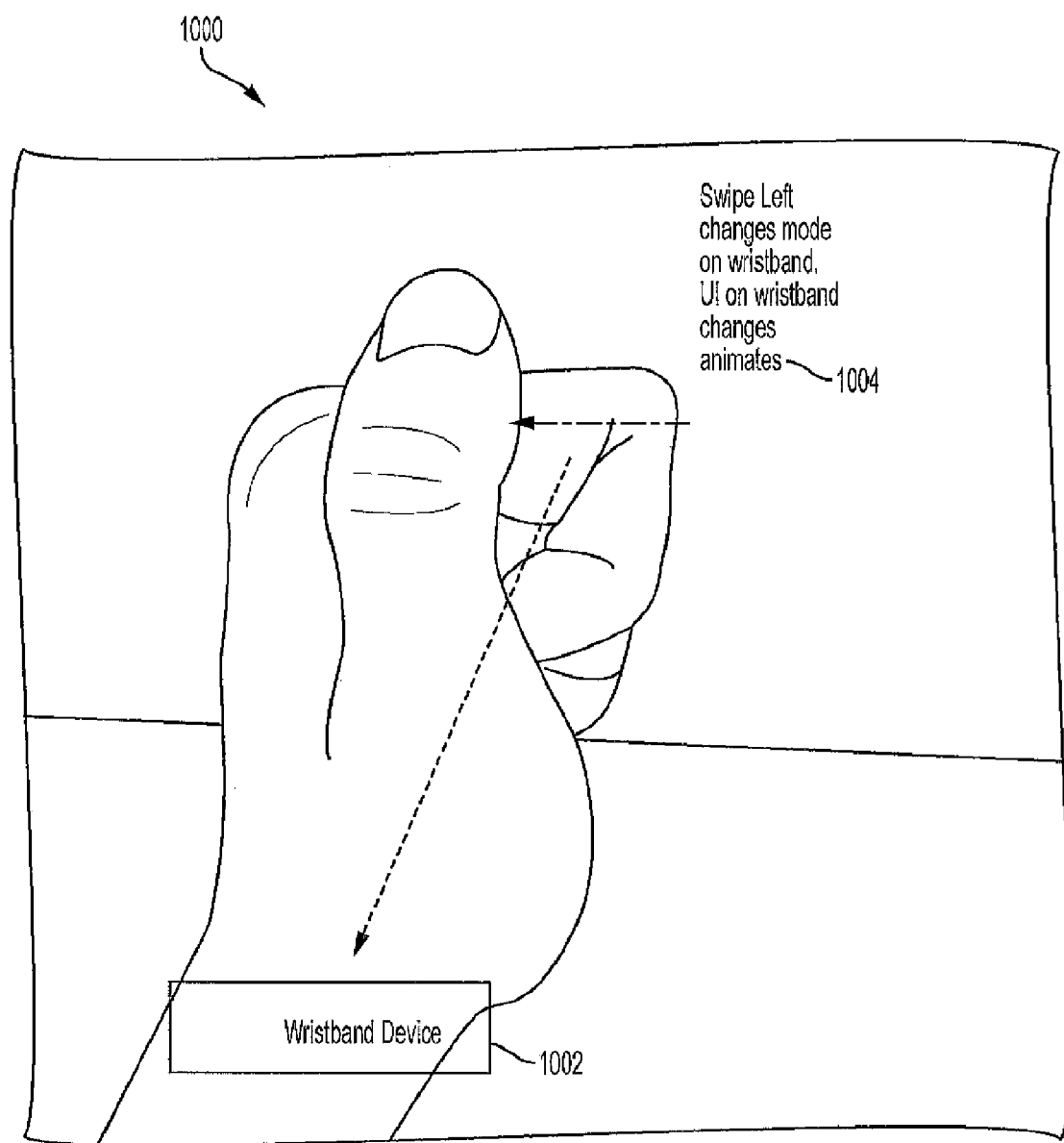
FIG. 10 illustrates a user point of view of the wearable camera device in accordance with an embodiment.
Figure 11:
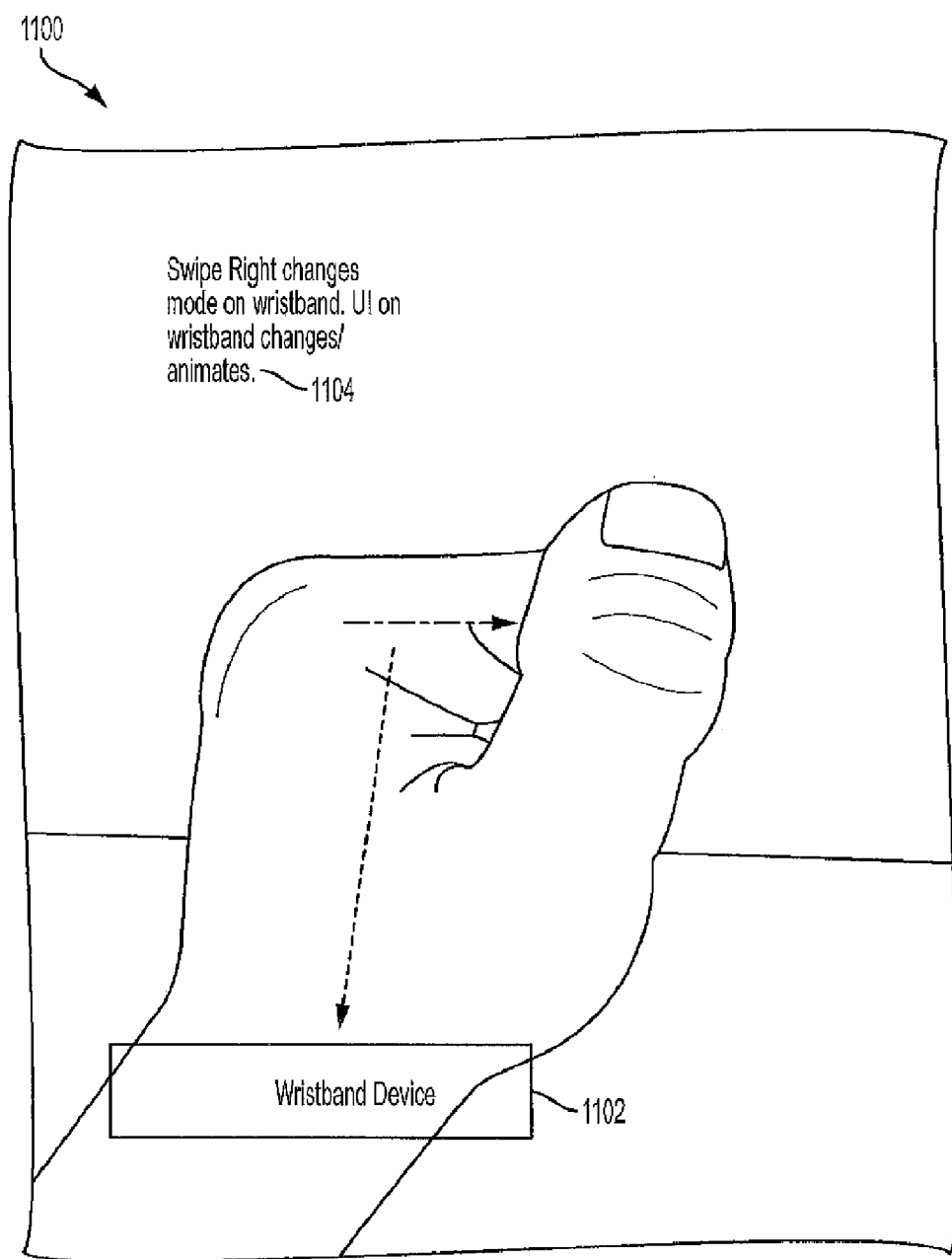
FIG. 11 illustrates a user point of view of the wearable camera device in accordance with an embodiment.

The wristband device of the wearable camera device detects a plurality of sensor signals and determines a plurality of gestures using the plurality of sensor signals. The plurality of sensor signals can represent either a single gesture (e.g., "clicking" motion of one finger, etc.) or a set of gestures in a specific sequence (e.g., sliding a finger to the left or right and tapping, etc.) that the firmware of the wristband device constitutes as a single action. Once the gesture is determined from the detected sensor signals, the firmware of the wristband device sends out an associated command to control the camera. FIGS. 9-11 represent additional sets of gestures that the wristband device can determine as a single action.

FIG. 9 illustrates a user point of view of the wearable camera device 900 in accordance with an embodiment. The wearable camera device 900 has components similar to the wearable camera device 500 of FIG. 5 including a wristband device 902 and a camera coupled to or integrated within the wristband device 902. The wristband device 902 has determined a gesture 904 that comprises the user tapping or double tapping the thumb. The gesture 904 triggers the wearable camera device 900 to display the target/subject of the photo/video on the wristband device 902. In this embodiment, the wristband device 902 includes a user interface display that can display the subject that is being photographed by the camera to ensure that the user has focused the camera correctly upon the target/subject that the user wants to photograph/video.

FIG. 10 illustrates a user point of view of the wearable camera device 1000 in accordance with an embodiment. The wearable camera device 1000 has components similar to the wearable camera device 500 of FIG. 5 including a wristband device 1002 and a camera coupled to or integrated within the wristband device 1002. The wristband device 1002 has determined a gesture 1004 that comprises the user swiping left with the thumb. The gesture 1004 triggers the wearable camera device 1000 to change various modes of the camera and the mode change is displayed on the user interface of the wristband device 1002. In this embodiment, the wristband device 1002 includes a user interface display that can display the varying modes. In one embodiment, the modes are varied using alternating LED patterns. In another embodiment, the modes are varied and the text (e.g., "Photo Taking", "Video Taking", "Night-Time Photo", etc.) is displayed on the user interface display.

FIG. 11 illustrates a user point of view of the wearable camera device 1100 in accordance with an embodiment. The wearable camera device 1100 has components similar to the wearable camera device 500 of FIG. 5 including a wristband device 1102 and a camera coupled to or integrated within the wristband device 1102. The wristband device 1102 has determined a gesture 1104 that comprises the user swiping right with the thumb. The gesture 1104 triggers the wearable camera device to also change various modes of the camera (in the opposite direction as swiping left so essentially the user can scroll left and right through various options) and the mode change is displayed on the user interface of the wristband device 1102. In this embodiment, the wristband device 1102 includes a user interface display that can display the varying modes. In one embodiment, the modes are varied using alternating LED patterns. In another embodiment, the modes are varied and the text (e.g., "Photo Taking", "Video Taking", "Night-Time Photo", etc.) is displayed on the user interface display.

Figure 12:
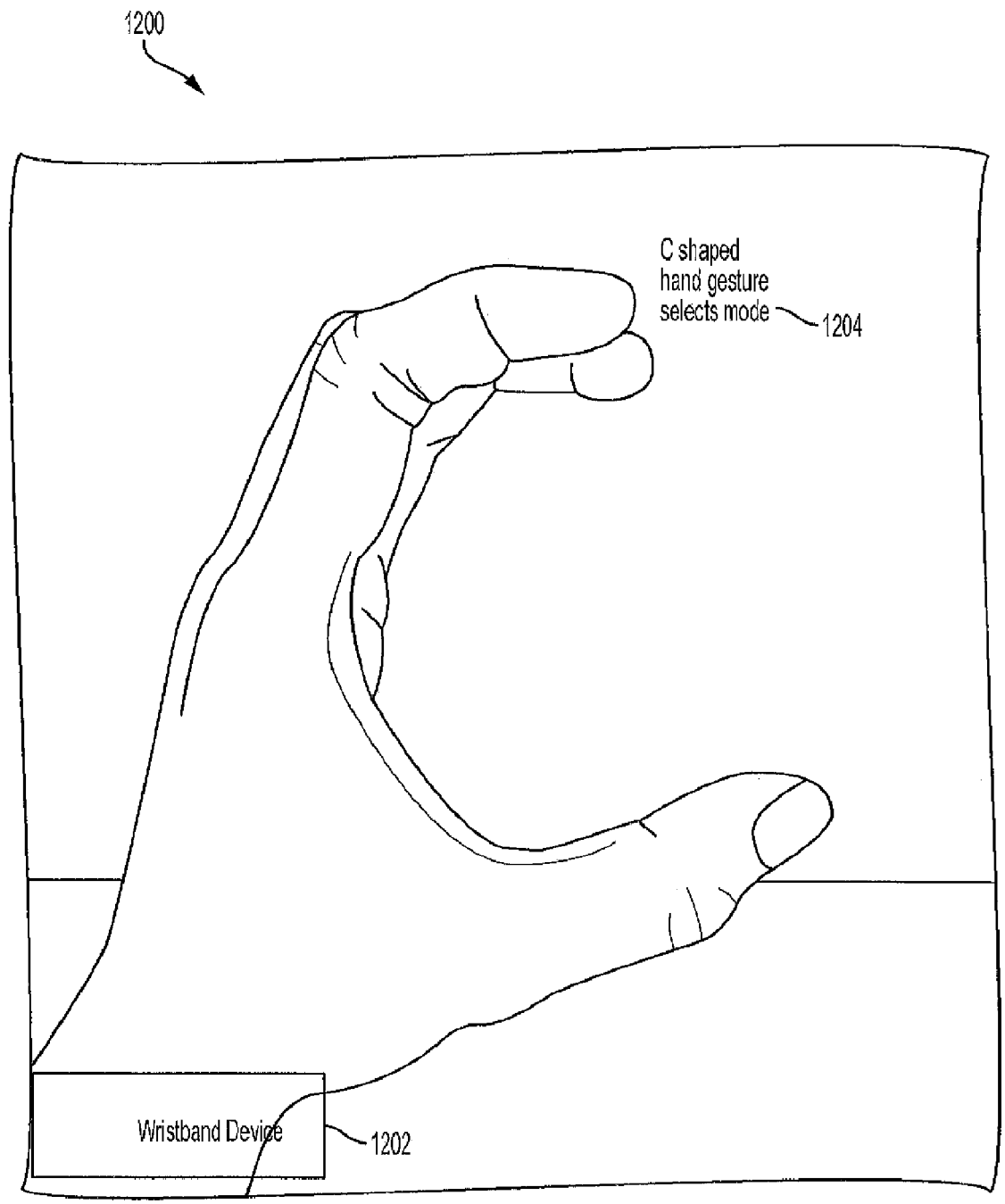
FIG. 12 illustrates a user point of view of the wearable camera device in accordance with an embodiment.

FIG. 12 illustrates a user point of view of the wearable camera device 1200 in accordance with an embodiment. The wearable camera device 1200 has components similar to the wearable camera device 500 of FIG. 5 including a wristband device 1202 and a camera coupled to or integrated within the wristband device 1202. The wristband device 1202 has determined a gesture 1204 that comprises the user holding his/her fingers in a "C" shape. The gesture 1204 triggers the wearable camera device 1200 to select the mode that the user has scrolled to (by swiping left or right). In another embodiment, the user can input various other hand gestures and shapes that are associated with mode selection.

Figure 13:
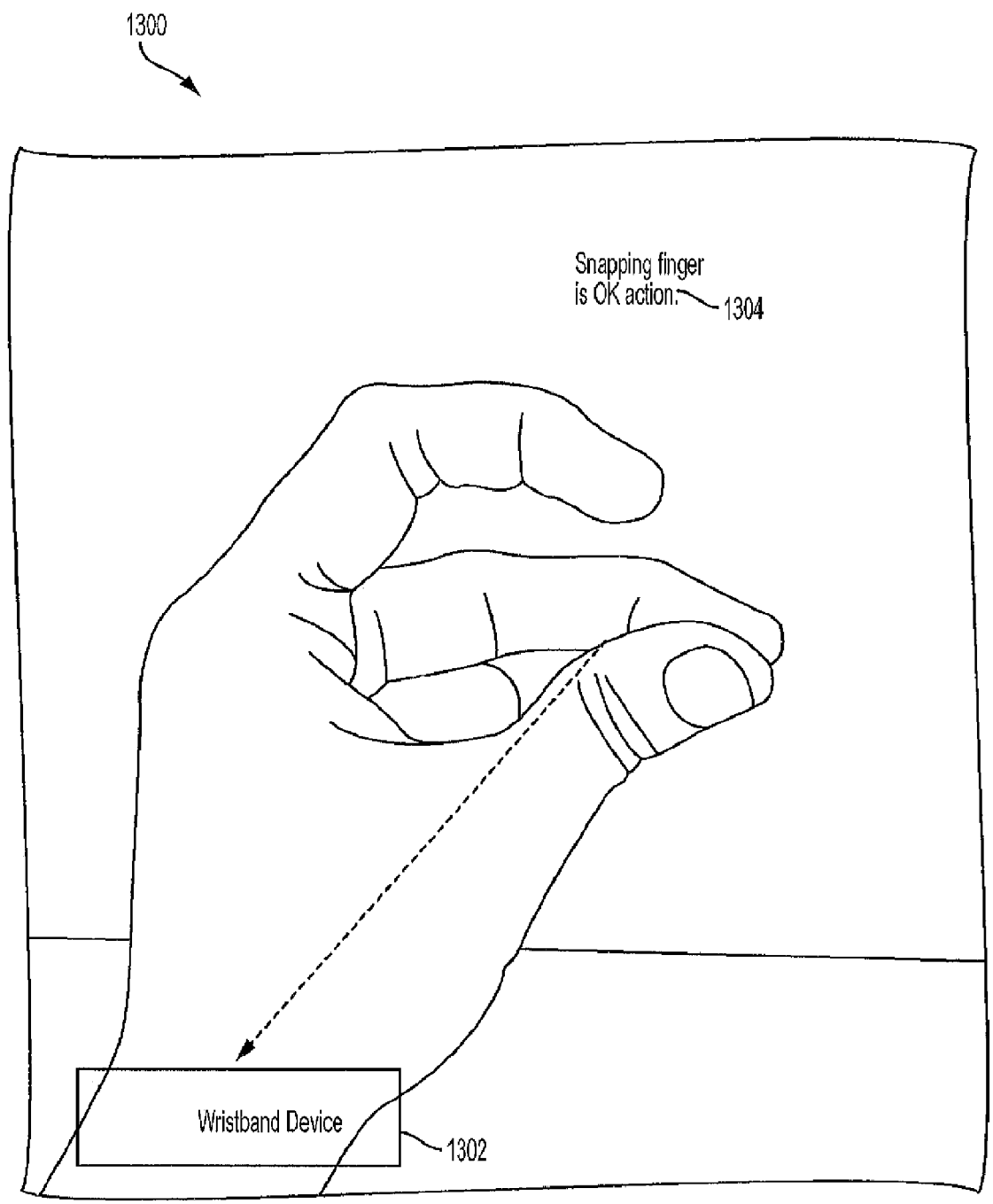
FIG. 13 illustrates a user point of view of the wearable camera device in accordance with an embodiment.

FIG. 13 illustrates a user point of view of the wearable camera device 1300 in accordance with an embodiment. The wearable camera device 1300 has components similar to the wearable camera device 500 of FIG. 5 including a wristband device 1302 and a camera coupled to or integrated within the wristband device 1302. The wristband device 1302 has determined a gesture 1304 that comprises the user's fingers snapping. The gesture 1304 triggers an "OK" action to the wearable camera device 1300. In one embodiment, the "OK" action represents the user setting or acknowledging a particular setting or command that may be displayed to the user as feedback on the device interface output (e.g., LEDs, user interface display, etc.).

Figure 14:
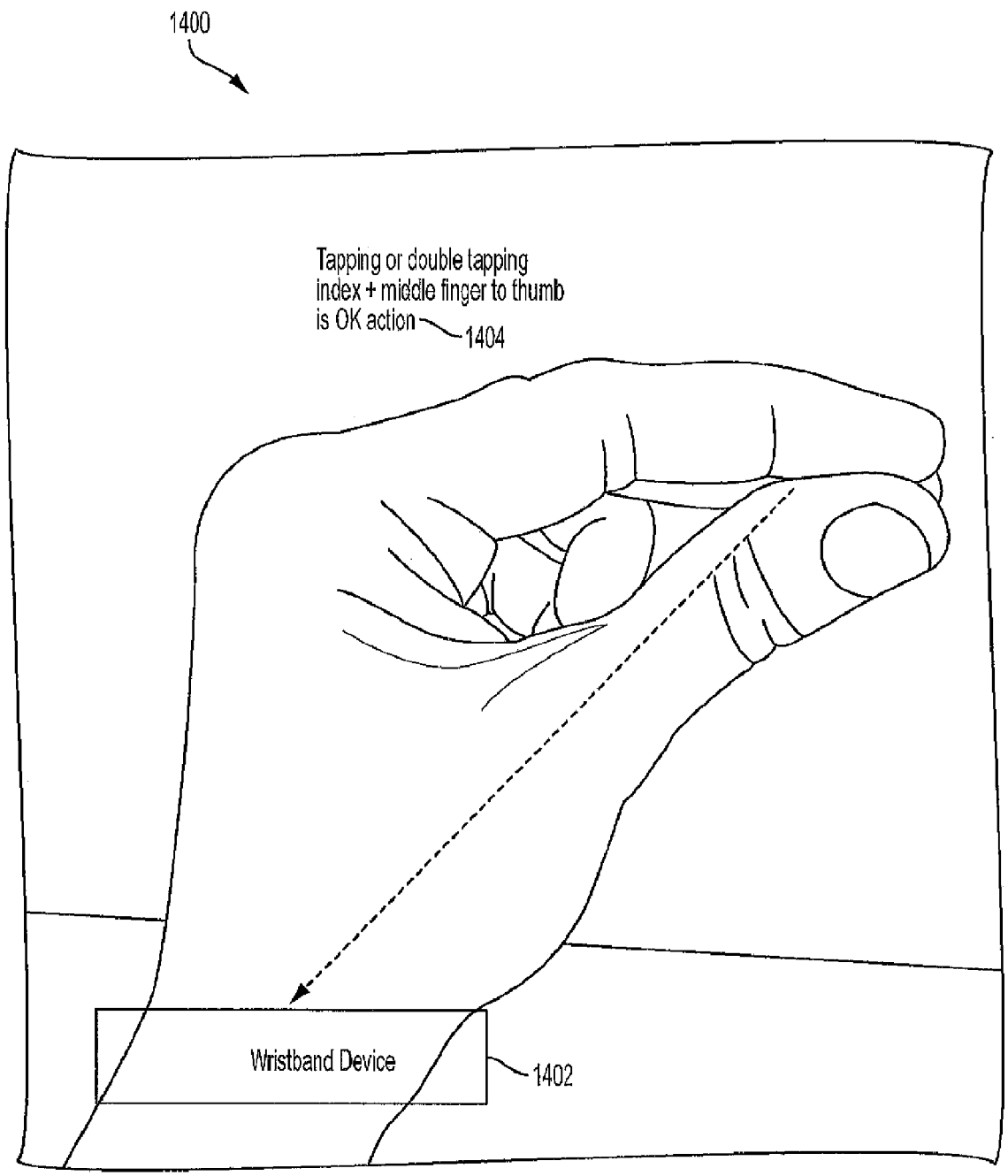
FIG. 14 illustrates a user point of view of the wearable camera device in accordance with an embodiment.

FIG. 14 illustrates a user point of view of the wearable camera device 1400 in accordance with an embodiment. The wearable camera device 1400 has components similar to the wearable camera device of FIG. 5 including a wristband device 1402 and a camera coupled to or integrated within the wristband device 1402. The wristband device 1402 has determined a gesture 1404 that comprises the user tapping or double tapping the index finger and the middle finger both to the thumb. The gesture 1404 triggers an "OK" action to the wearable camera device 1400. In one embodiment, the "OK" action represents the user setting or acknowledging a particular setting or command that may be displayed to the user as feedback on the device interface output (e.g., LEDs, user interface display, etc.). One of ordinary skill in the art readily recognizes that other user movements can be associated with an "OK" action and that would be within the spirit and scope of the present invention.

Figure 15:
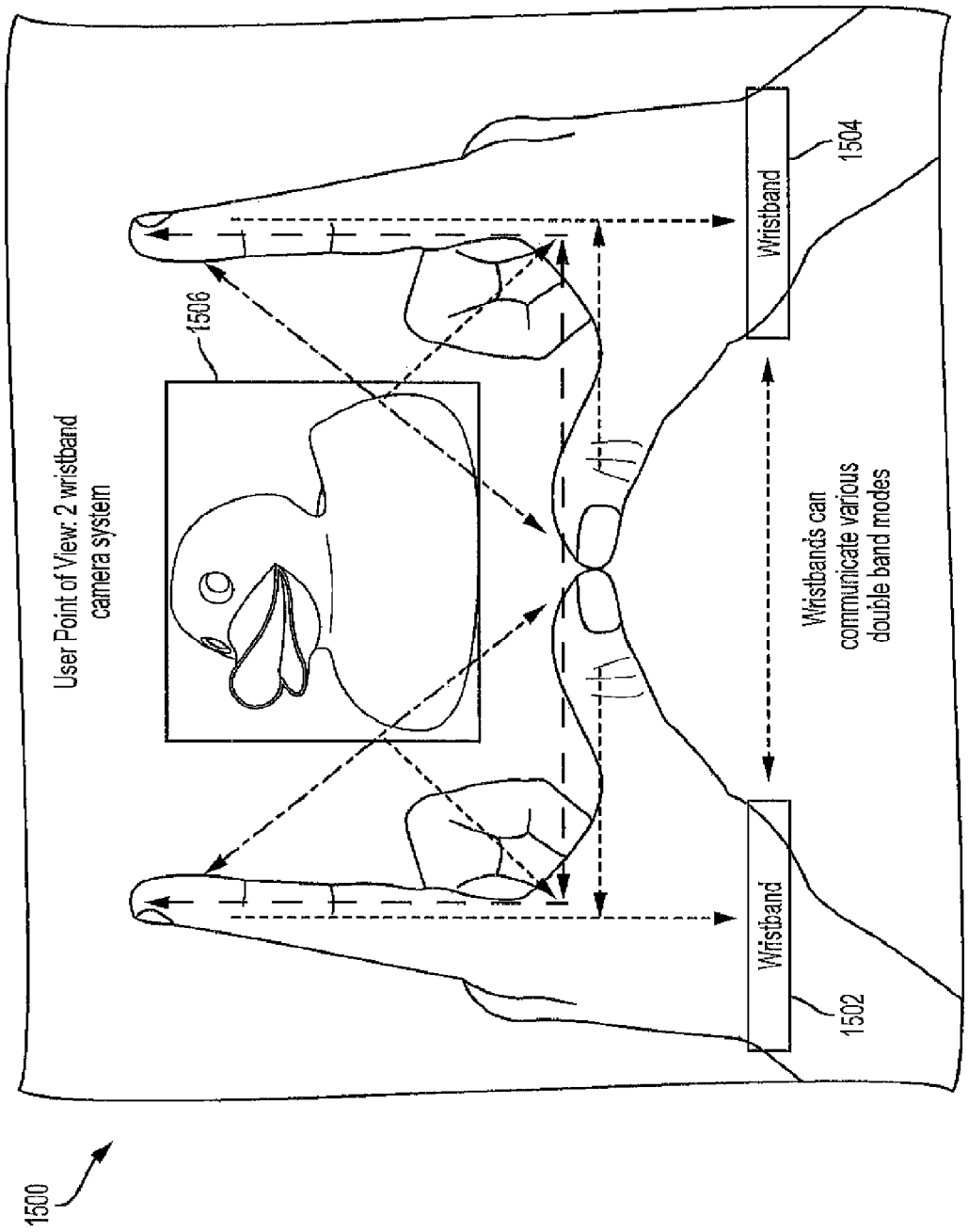
FIG. 15 illustrates a user point of view of a multi-wearable camera device system in accordance with an embodiment.

FIG. 15 illustrates a user point of view of a multi-wearable camera device system 1500 in accordance with an embodiment. The multi-wearable camera device system 1500 includes a first wearable camera device 1502 coupled to a second wearable camera device 1504. The first and the second wearable camera devices 1502-1504 enhance the user's ability to frame a target/subject 1506. In addition, the first and the second wearable camera devices 1502-1504 communicate with each other and enable the user to select from various dual wristband modes. In one embodiment, the multi-wearable camera device system 1500 syncs and stiches together image and video capture thereby creating panorama or wide angle capture. In another embodiment, the multi-wearable camera device system 1500 provides syncing and capturing of 30 image or video captures, 30 stereoscope vision, and 30 zooming.

Figure 16:
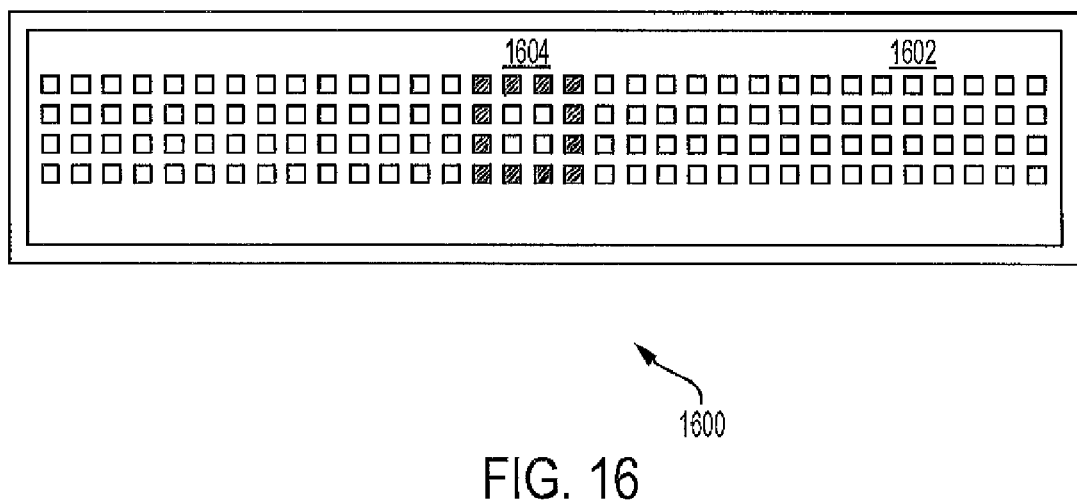
FIG. 16 illustrates a user interface display of a wearable camera device in accordance with an embodiment.

FIG. 16 illustrates a user interface display of a wearable camera device 1600 in accordance with an embodiment. The wearable camera device 1600 includes a user interface display 1602. In one embodiment, the user interface display 1602 comprises LEOs that display various patterns such as the pattern 1604 based upon camera settings and notifications. In one embodiment, the LEDs are integrated via laser cut holes cut into the user interface display 1602. The user can use hand gestures (waiving across the user interface display 1602) or touch gestures (pressing on the user interface display 1602) to respond to the various notifications or delete them. One of ordinary skill in the art readily recognizes that the wearable camera device can include varying types of display units and user interfaces and that would be within the spirit and scope of the present invention.

Figure 17:
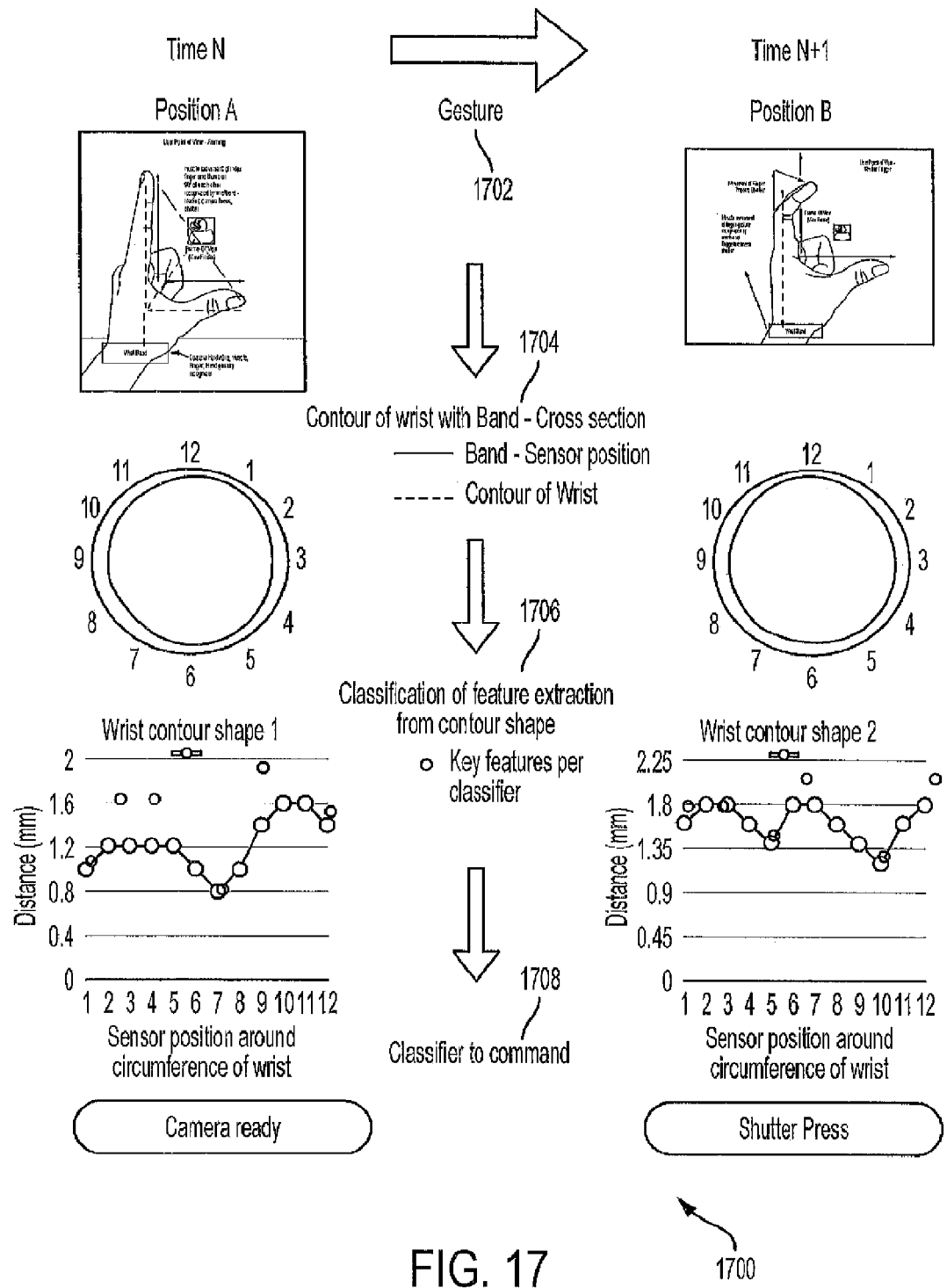
FIG. 17 illustrates a method for capturing media using gesture recognition by a wearable camera device in accordance with an embodiment.

FIG. 17 illustrates a method 1700 for capturing media using gesture recognition by a wearable camera device in accordance with an embodiment. The media can include photos, video, and/or other types of media. The method 1700 represents two time points (N and N+1). The user of the wearable camera device starts in position A (with the index finger and thumb approximately 90 degrees from each other) at time point N and ends in position B (with the index finger slightly lowered in a "clicking" motion) at time point N+1. The wearable camera device detects the user's hand positioning and movements using a plurality of embedded sensors and determines various gestures from the detected positioning/movements, via step 1702.

To determine the gestures from the detected user movements, the wearable camera device utilizes a contour mapping mechanism that provides a contour map of the anatomical contours of the user's wrist that is wearing the wristband device of the wearable camera device, via step 1704. The wristband device (band and embedded sensors) position around the user's wrist is denoted by a solid line and the contour of the user's wrist is denoted by a dotted line. When the user's hand is in position A at time point N, the contour map of the user's wrist is in wrist contour shape one (1) and when the user's hand shifts in position from position A to position B at time point N+1, the contour map of the user's wrist is in wrist contour shape two (2).

After determining the change in the contour map via step 1704, the wristband device classifies the contour changes using feature extraction and associated classifiers from contour shapes, via step 1706. The key features of the classifier are plotted on a graph that depicts a distance in millimeters (mm) on the y-axis and that depicts the sensor position around the circumference of the wrist and based upon the contour map on the x-axis. When the user's hand is in position A at time point N, the plotted graph displays the wrist contour shape 1 in a first sensor position and when the user's hand is in position B at time point N+1, the plotted graph displays the wrist contour shape 2 in a second sensor position.

After classifying the sensor positions to determine the gesture, the wearable camera device the determined gesture is associated with a certain command that is then transmitted to the camera, via step 1708. For example, when the wearable camera device determines the first sensor position (that is associated with a first gesture), the camera receives a "camera ready" command (because that command is associated with the first gesture) and when the wearable camera device determines the second sensor position (after the user has changed orientation of his/her hand which is associated with a second gesture), the camera receives a "shutter press" command (because that command is associated with the second gesture) and the photo/video is captured by the wearable camera device. One of ordinary skill in the art readily recognizes that a variety of contour shapes and sensor positions can be associated with a variety of gestures and subsequently with a variety of commands and that would be within the spirit and scope of the present invention.

Figure 18:
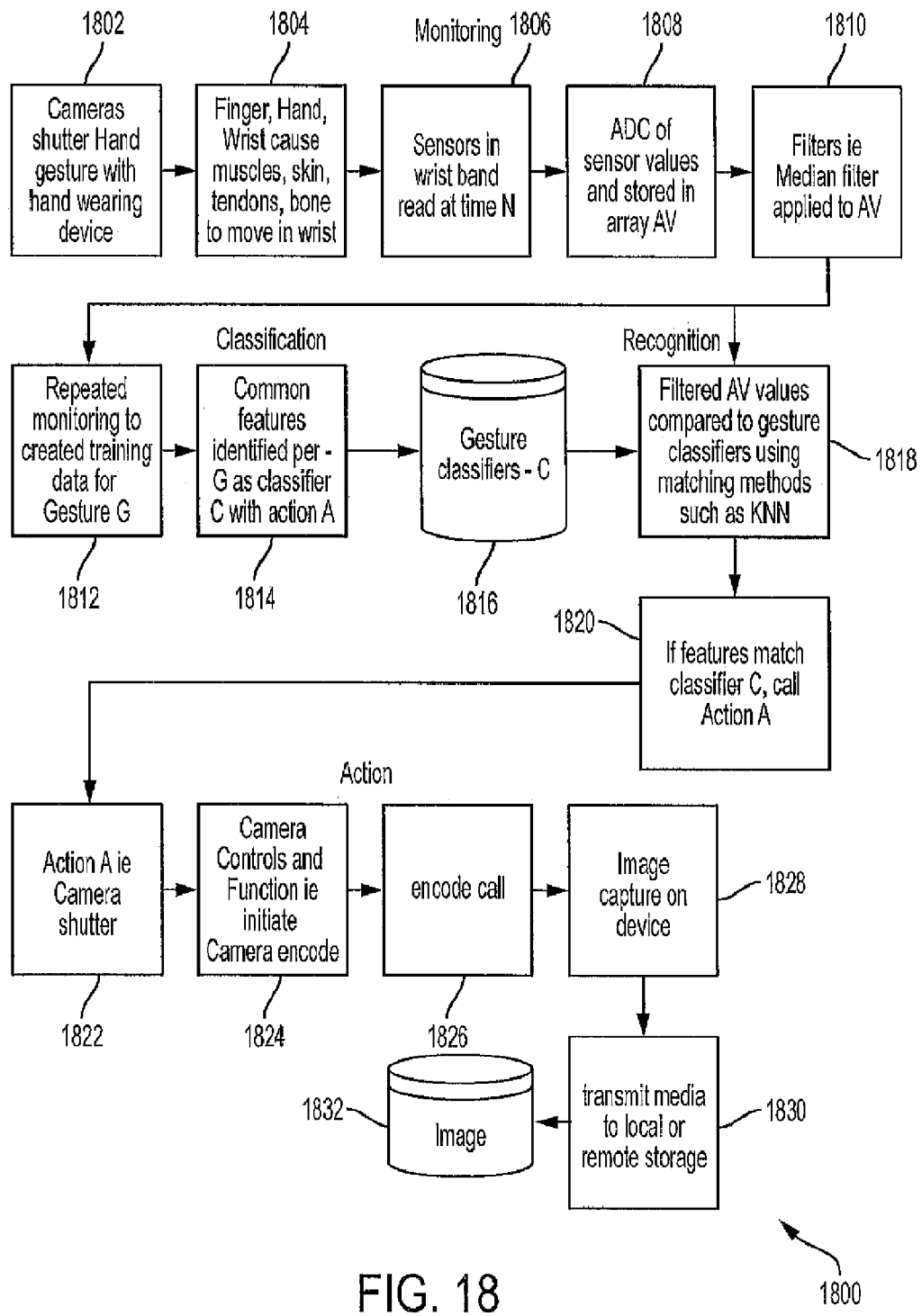
FIG. 18 illustrates a method for capturing media using gesture recognition by a wearable camera device in accordance with an embodiment.

FIG. 18 illustrates a method 1800 for capturing media using gesture recognition by a wearable camera device in accordance with an embodiment. The media can include photos, video, and/or other types of media. The wearable camera device monitors the hand of a user wearing the wearable camera device (that includes a wristband device and a camera coupled to or integrated within the wristband device), via step 1802. When the user moves a portion of the hand, the fingers, and/or the wrist (user movements), the user movements cause muscle, skin, tendons, and bone to move as well allowing the wearable camera device to detect the user movements as sensor values, via step 1804, by using embedded sensors within the wristband device of the wearable camera device at a time point N, via step 1806. The detected sensor values are converted into a signal using an ADC and stored as an array of values (AV), via step 1808. After storage, filters (e.g., median filter) are applied to the array of values (AV), via step 1810. Steps 1802-1810 represent the "monitoring" phase of the method 1800 utilized by the wearable camera device.

The monitoring phase is repeated by the wearable camera device to create enough training data for certain gestures (G, G1, etc.), via step 1812. Once enough training data is created (or pre-downloaded into the wearable camera device), common features are identified for each gesture (G, G1, etc.) that are each associated with certain gesture classifiers (C, C1, etc.) that are each associated with certain actions (A, A 1, etc.), via step 1814. The wearable camera device receives the determined gestures and creates a gesture classifier for each, via step 1816. Steps 1812-1816 represent the "classification" phase of the method 1800 utilized by the wearable camera device.

After the classification phase has been completed by the wearable camera device and enough training data has been created, via step 1816, the wearable camera device compares the filtered AV values to the gesture classifiers (created via step 1816) using matching methodologies including but not limited to machine learning and k-nearest neighbor algorithms (KNN), via step 1818. If the features from the filtered AV values match a certain gesture classifier, the wearable camera device calls the action (transmits the command to the camera) associated with that certain gesture classifier, via step 1820. For example, if filtered AV values (or sensor data) matches a certain gesture G1 that is associated with classifier C1 that is associated with action A1, then the wearable camera device will call and transmit a command/instruction to the camera for action A 1. Steps 1818-1820 represent the "recognition" phase of the method 1800 utilized by the wearable camera device.

After the recognition phase has been completed by the wearable camera device, the action command or call (e.g., camera shutter) is received by the camera, via step 1822, and the camera firmware initiates camera encoding of the camera controls and functions, via step 1824. The action command or call is encoded, via step 1826, and the action is executed (e.g., the camera captures the image), via step 1828. Once the image (or video) is captured, the wearable camera device transmits the media to a local or remote storage, via step 1830, and a user can view the media, via step 1832. One of ordinary skill in the art readily recognizes that the wearable camera device can associated a plurality of sensor values with gestures, classifiers, and actions and that would be within the spirit and scope of the present invention.

Figure 19:
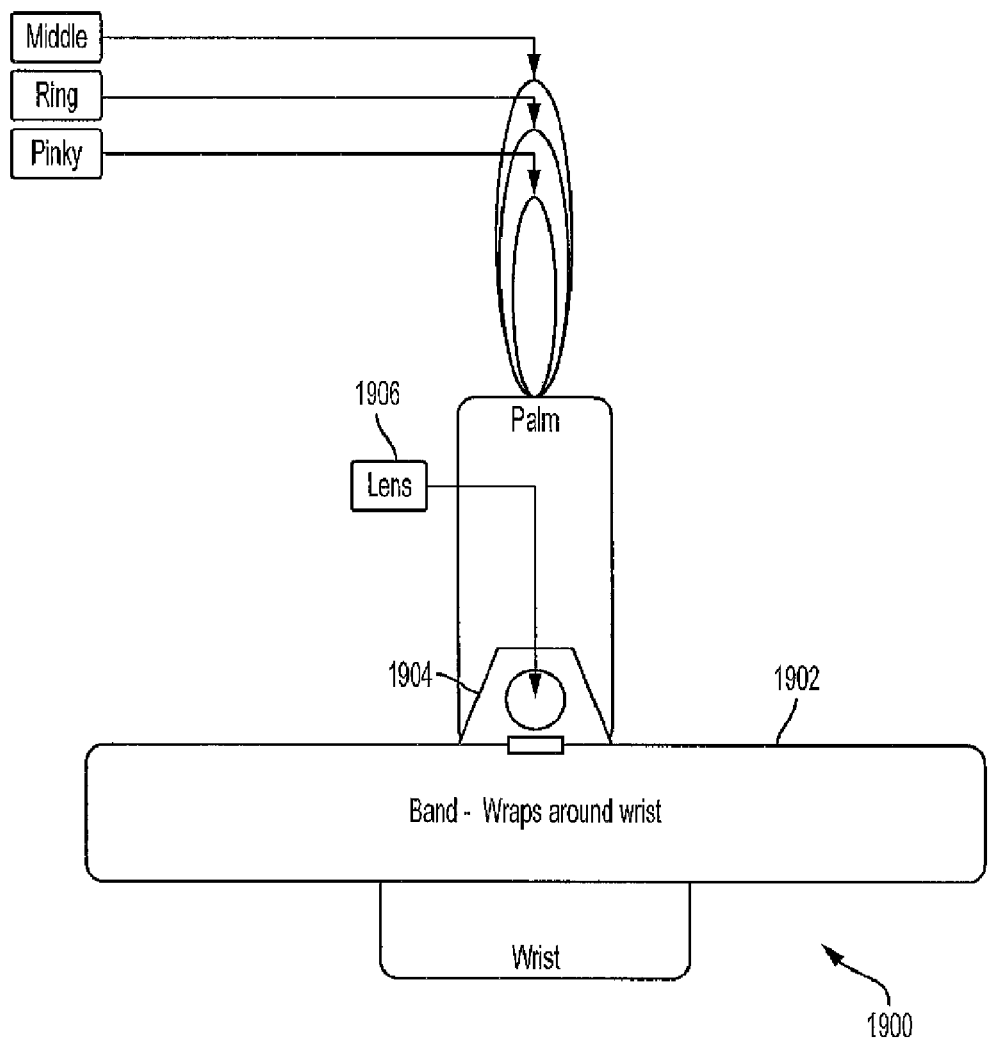
FIG. 19 illustrates a subject point of view of a wearable camera device in accordance with an embodiment.

FIG. 19 illustrates a subject point of view of a wearable camera device 1900 in accordance with an embodiment. The wearable camera device 1900 includes a wristband device 1902 (or band) that wraps around the wrist of the user and a camera 1904 that is coupled to or integrated within the wristband device 1902. The camera 1904 includes a camera lens 1906 and a camera sub assembly. In one embodiment, the camera lens 1906 is mechanically and flexibly affixed to the wristband device 1902 near the bottom of the user's palm. The flex fixing camera lens 1906 mechanically moves with the movements/gestures of the user's wrist and palm. In another embodiment, the camera lens 1906 is rigidly fixed to a portion of the wristband device 1902 that is controllable by electromechanical actuation based on movements/gestures.

The subject point of view represents the view from a subject that is looking straight at the camera lens 1906. The subject point of view shows the palm and various fingers (middle, ring, pinky) of the user. The wristband device 1902 includes a plurality of components including but not limited to sensors, display unit, hardware platform, battery, storage, and radio. In one embodiment, the wristband device 1902 rotates around the user's wrist enabling the camera lens 1906 to either face outward towards the subject or face inward towards the user for "selfie" picture capturing capability.

A system and method in accordance with the present invention discloses a wearable camera system (wearable camera device) for capturing media (photo/video). The wearable camera device comprises a wristband device that includes at least one sensor. In one embodiment, the wearable camera device also comprises a camera coupled to the wristband device. In another embodiment, the camera is integrated within the wristband device as one overall device. The camera is controlled by at least one gesture determined from user movements and sensor data detected by the at least one sensor.

The wristband device includes additional hardware components including but not limited to a processor that analyzes the user movements detected by the at least one sensor and a memory device that stores the various data (detected user movements, determined gestures, etc.). The at least one sensor detects the user movements by detecting any of muscle, tendon, bioelectromagnetics, and anatomical contour changes of the user. In one embodiment, the processor analyzes the detected user movements using a sensor data classification unit that utilizes filters and algorithms that extract features from the user movements to determine the at least one gesture. The sensor data classification unit utilizes any of back propagation, Bayes networks, neural networks, and machine learning to determine the user gestures.

In one embodiment, the at least one sensor is any of a gyroscope, an accelerometer, a pressure sensor, a temperature sensor, and a light sensor. In one embodiment, the camera is controlled without using any of an optical viewfinder or a digital viewfinder and instead uses a natural viewfinder created by the user's natural fingers. In one embodiment, the camera includes a lens that is small (e.g., thumbnail sized) and the lens is positioned to follow the rotational movement of the user. This ensures that the lens is never obstructed and is positioned on the user's wrist in a way that enables clear targeting of the photo/video/media subjects that the user wants to capture.

The wearable camera device can determine a plurality of gestures that trigger various camera actions. In one embodiment, the gesture includes a user extending an index finger and thumb approximately 90 degrees from each other to create one corner of a camera frame. In this embodiment, the camera shutter's plan is substantially parallel to a plane created by the extending of the index finger and thumb. In another embodiment, the user can determine various hand gestures and actions and correlate each of these hand gestures and actions to specific camera actions. In another embodiment, based upon a continuously updated database or software updates, the wearable camera device determines additional gestures and associated camera actions.

In one embodiment, once the user extends the index finger and thumb approximately 90 degrees from each other in a certain gesture and the wearable camera device determines the certain gesture, the wristband device of the wearable camera device instructs/controls/transmits a message to the camera to open the shutter and await a photo/video/media capture gesture from the user. In one embodiment, the user provides a photo/video/media capture gesture by simulating a button pressure. In another embodiment, the user provides a photo/video/media capture gesture by another gesture that is either predetermined (i.e., predefined) or inputted by the user such as snapping of the fingers.

In one embodiment, the at least one gesture or plurality of gestures that the wearable camera device can determine includes any of initializing camera function, semicircle shapes, circle shapes, OK action, hang loose action, swipe left across index finger, swipe right across index finger, tap between fingers, double tap between fingers, witching modes, selecting options, zooming, triggering a shutter to start capture, and triggering a shutter to start motion capture.

In one embodiment, the wearable camera device includes a communication device (e.g., transmitter/receiver device) coupled to both the wristband device and the camera (or just one of either the wristband device and the camera). In this embodiment, the communication device transmits data from either or both the wristband device (e.g., user movements, gestures, etc.) and the camera (e.g., photos, videos, media, etc.) to another device that comprises any of a smartphone and a cloud-based server system. In one embodiment, the wristband device includes a user interface display that comprises a plurality of light emitting diodes (LEDs) that produces various patterns associated with camera actions and notifications and alerts for the user.

As above described, a system and method in accordance with the present invention utilizes a wristband device that includes a plurality of sensors and a processor and a camera mounted to the wristband device to provide a gesture operated wrist-mounted camera system (wearable camera device). The wearable camera device is an unobtrusive accessory-type wristband camera that can be worn by the user for 24 hours a day so that the user can take photos and videos at any time and with ease. The wearable camera device is convenient (in accessibility, size, shape, weight, etc) and quickly produces high quality and framed camera shots and videos once user movements and gestures associated with various commands are detected by the wearable camera device.

A system and method for operating a wrist-mounted camera system utilizing gestures has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium (non-transitory). Examples of a computer-readable medium include a semiconductor or solid state memory, magnetic tape, a removable computer diskette a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
   a wristband device including a sensor to determine gestures based on a contour map; and
   a camera coupled to the wristband device, the camera including a lens at a position that is parallel to a plane of a field of view created by an index finger and a thumb of a user, the camera being actuated by at least one of the gestures.

2. The system of claim 1, wherein the sensor detects signals and the wristband device further includes a processor that analyzes the signals using a contour mapping mechanism to generate the contour map.

3. The system of claim 2, wherein the signals are detected based on at least one of muscle, tendon, bioelectromagnetics, or anatomical contour changes associated with user movements.

4. The system of claim 2, wherein the signals are analyzed using sensor data classification of the contour mapping mechanism to extract features used to determine the gestures.

5. The system of claim 4, wherein the sensor data classification includes at least one of back propagation, bayes networks, neural networks, or machine learning.

6. The system of claim 1, wherein the sensor is at least one of a gyroscope, an accelerometer, a pressure sensor, a temperature sensor, or a light sensor.

7. The system of claim 1, wherein the camera is controllable without using at least one of an optical viewfinder or a digital viewfinder.

8. The system of claim 1, wherein the camera includes a lens that is thumbnail sized.

9. The system of claim 3, wherein the user movements include at least one of rotating a wrist of a user, rotating an arm of a user, or extending an index finger and a thumb of a user approximately 90 degrees from each other.

10. The system of claim 9, wherein a plane of a shutter is substantially parallel to a plane created by the extending of the index finger and the thumb of the user approximately 90 degrees from each other.

11. The system of claim 10, wherein in response to the extending of the index finger and the thumb of the user approximately 90 degrees from each other, the processor transmits instructions to the camera to open the shutter.

12. The system of claim 11, wherein the processor determines that the user is simulating a button press when the index finger is contracted to a predefined position thereby triggering the camera to capture media.

13. The system of claim 1, wherein the gestures include at least one of initializing camera function, semicircle shapes, circle shapes, OK action, hang loose action, swipe left across index finger, swipe right across index finger, tap between fingers, double tap between fingers, switching modes, selecting options, zooming, triggering a shutter to start capture, or triggering a shutter to start motion capture.

14. The system of claim 1, further comprising:
   a communication device coupled to both the wristband device and the camera, the communication device transmitting data from both the wristband device and the camera to another device that comprises at least one of a smartphone or a server.

15. The system of claim 1, wherein the wristband device further includes a light emitting user interface that produces notifications using light-emitting diodes (LEDs).

* * * * *